(12) United States Patent
Stanchfield et al.

(10) Patent No.: US 6,479,020 B1
(45) Date of Patent: Nov. 12, 2002

(54) MULTI-WELL APPARATUS WITH INDEPENDENTLY DETACHABLE UPPER AND LOWER COVERS

(75) Inventors: James E. Stanchfield, Sunnyvale; Paul B. Robbins, Palo Alto; Chris N. Bailey, San Jose; David J. Wright, Fremont, all of CA (US)

(73) Assignee: Robbins Scientific Corporation, Sunnyvale, CA (US)

( * ) Notice: Subject to any disclaimer, the term of this patent is extended or adjusted under 35 U.S.C. 154(b) by 0 days.

(21) Appl. No.: 09/498,942

(22) Filed: Feb. 4, 2000

Related U.S. Application Data

(63) Continuation of application No. 08/972,996, filed on Nov. 18, 1997, now Pat. No. 6,054,100.
(60) Provisional application No. 60/043,211, filed on Apr. 9, 1997, and provisional application No. 60/031,024, filed on Nov. 18, 1996.

(51) Int. Cl.$^7$ .................................................. B01L 3/00
(52) U.S. Cl. ........................ 422/102; 422/99; 422/101; 422/106
(58) Field of Search ................................ 422/102, 101, 422/104, 99; 435/305.3, 288.4

(56) References Cited

U.S. PATENT DOCUMENTS

| | | | |
|---|---|---|---|
| 4,912,057 A | * | 3/1990 | Guirgius et al. |
| 4,948,564 A | * | 8/1990 | Root et al. |
| 5,324,483 A | * | 6/1994 | Cody et al. |
| 5,753,187 A | * | 5/1998 | Reynolds et al. ........... 422/102 |
| 6,054,100 A | * | 4/2000 | Stanchfield et al. ........ 422/102 |

OTHER PUBLICATIONS

Meyers et al, Multiple simultaneous synthesis of phenolic libraries, Molecular Diversity, 1 (1995) 13–20.*

* cited by examiner

*Primary Examiner*—Alexander Markoff
(74) *Attorney, Agent, or Firm*—Larry B. Guernsey; Intellectual Property Law Offices

(57) ABSTRACT

An improved multi-well synthesis and filtration apparatus (10) includes a deep-well synthesis block (12) having a plurality of flowthrough wells (24) optionally fitted with filter disks (48) each of the wells (24) being integrally formed in the synthesis block (12), such that any material placed in the wells (24) is in immediate contact with the material of the synthesis block (12), an upper cover (14), a lower cover (16), and a pair of first and second sheet gaskets (18, 20). The first and second sheet gaskets (18, 20) are interposed between the upper and lower covers (14, 16) to seal inlet portions (38) and outlet spouts (40) of the wells (24). The upper and lower covers (14, 16) are independently releasable, and, with the gaskets (18, 20) form a gas tight seal, so that material is retained in the wells (24) when the lower cover (16) is removed, but the upper seal maintained. Apertures (70) in the upper cover (14) provide that the first sheet gasket (18) may be punctured for introduction of materials and/or maintenance of an inert atmosphere.

An alternative synthesis block (412) having half the number of wells (424) but configured to be able to use a collection plate (123) of the same array as the first embodiment is also described.

15 Claims, 14 Drawing Sheets

MULTI-WELL APPARATUS WITH INDEPENDENTLY DETACHABLE UPPER AND LOWER COVERS

This application claims priority from U.S. Provisional Applications Ser. No. 60/031,024, filed Nov. 18, 1996, and No. 60/043,211, filed Apr. 9, 1997, and is a continuation of U.S. Non-provisional Application Serial No. 08/972,996, filed Nov. 18, 1997, now U.S. Pat. No. 6,054,100, from which it also claims priority, all of which have the same inventors as the present application.

TECHNICAL FIELD

The present invention relates generally to apparatus for synthesizing and culturing chemical and biological compounds, to chemical and biological filtration apparatus, and to multi-well apparatus, and more particularly to such apparatus used for performing multiple simultaneous syntheses and filtrations on a micro scale.

BACKGROUND ART

As the scale on which chemical compounds and biological materials are capable of being analyzed, tested, purified and otherwise manipulated for research and clinical purposes continues to decrease, there is a call for increasingly more efficient methods of synthesizing and culturing such compounds and materials. Numerous benefits, in particular, are offered by the extremely small or "micro" scale preparation of chemical and biochemical molecules. Among such benefits are that costs with respect to the reagents, solvents and other materials employed for reaction, workup and purification—many of which can be quite expensive—are greatly reduced. Further, the amounts of by-products and other waste materials generated are also greatly reduced, thereby lowering disposal costs and also reducing the potential for environmental damage by hazardous materials. Moreover, the speed with which large numbers of chemical compounds can be synthesized for biological screening purposes can be greatly increased, since a large number of such microscale reactions can potentially be run and processed simultaneously in a single piece of apparatus using batch equipment.

Given that only a very minute percentage of chemical entities that are investigated will exhibit the desired characteristics for which they have been targeted and synthesized, and given that relatively small changes in chemical structure can produce profoundly different biological properties, the ability to rapidly synthesize large numbers of new compounds and analogs for evaluation is of especially great commercial importance, indeed, it is often a matter of economic survival to pharmaceutical and biotechnological companies involved in the development of new therapeutic agents.

It has been the case for a number of years in the peptide field that use has been made of mechanized, computer-aided equipment capable of simultaneously synthesizing a number of different peptides by the sequential coupling of amino acids to functionalized solid supports. Such mechanized equipment may be employed because the conditions necessary for most such coupling reactions are uniformly simple and straightforward.

In the case of the synthesis of organic compounds generally, however, there is a great variance in the conditions and techniques which must be employed, which precludes or makes impractical the use of fully automated instruments. For example, magnetic stirring, shaking, or some other form of agitation may be needed, and heating or cooling to great temperature extremes may be required. With respect to reactions requiring heating, provision for the reflux of volatile solvent may also be necessary. Further, many chemical reactions are air sensitive and so may require an inert atmosphere for their performance. Reagents and substrates may be air sensitive (e.g., hygroscopic or pyrophoric) or corrosive and require special handling techniques, such as transfer via a syringe or cannula, or even handling in a glove box. Many organic synthetic procedures require the addition of materials in both solid and liquid form or employ an addition sequence that is complex. Additionally, some delicate reactions must be closely monitored through intermittent sampling in order to bring the reaction to a successful fruition. Where an instrument(s) is capable of performing any of the above, it is still the case that throughput is limited, further, such instruments are extremely expensive.

One prior art attempt at providing an apparatus for the simultaneous, multiple synthesis of organic compounds is found in U.S. Pat. No. 5,324,483 issued Jun. 28, 1994 to Cody et al. In Cody, which is directed toward solid phase synthesis, the lower ends of a plurality of reaction tubes (in the nature of conventional gas dispersion tubes) are each received by a plurality of reaction wells. The reaction tubes are held vertically in place by a holder block, while the reactions wells are contained by a reservoir block. A seal is provided between the holder block and the reservoir block. A manifold covers the reaction tubes, with a seal being provided between the manifold and the holder block. Means are provided for detachably fastening together the reservoir block to the holder block and the holder block to the manifold. The dispersion tubes provide a glass frit type of filtering capability so that a solid support may be retained and rinsed as necessary after performance of a coupling reaction or cleavage of product from the support.

The invention of Cody offers the advantage that multiple reactions may be carried out simultaneously—even at reflux at atmospheric pressure conditions and while under an inert atmosphere, if necessary. However, the apparatus appears to be rather complex, bulky, awkward to use, fragile, and difficult to clean. The apparatus also is not very amenable to use with standard liquid handling systems and other batch-processing type equipment. Additionally, the apparatus is not well-suited for true microscale synthesis because the surface area of the components, particularly the gas dispersion tubes, is such that undesirable "hold-up" of liquid material is prone to occur.

Shown in an article by Meyers et al. entitled "Multiple simultaneous synthesis of phenolic libraries," *Molecular Diversity*, 1 (1995), pp. 13–20, is an apparatus for multiple, simultaneous (solid phase) synthesis that is considerably better suited to use with batch processing techniques. As described at p. 16 of the article (FIG. 4), Meyers uses a conventional "deep-well" multi-well plate in the standardized 96-well, 8×12 rectangular array format. Each well is modified by drilling a small hole in the well bottoms and then installing a filter frit in each well bottom. The deepwell plate is made to be liquid tight by sandwiching it between a clamping arrangement that utilizes a solid base element fitted with four threaded steel posts and a (open) frame element that sits on top of the plate and which is secured by knurl nuts. A planar rubber gasket, which rests on top of the base element, seals the openings at the bottoms of the wells, while the tops of the wells are sealed with 8-well strip caps (a total of twelve such strips would be required for sealing all of the wells). The invention provides that reactions may be carried out within the wells, with the solid support upon which the chemistry is conducted able to then be filtered and washed within the same wells by virtue of the fritted nature of the wells and the removable sealing means at the bottom.

As noted in Meyers, the 96-well format is ubiquitous and used in numerous applications. Meyers' invention is therefore theoretically able to be used in conjunction with automated high-throughput screens and many other types of equipment (e.g., multi-channel pipettors) that are based on that (standard) 96-well format. However, Meyers is limited in several respects. Perhaps most importantly, the sealing arrangement that is used for the bottom of the wells, i.e., the provision of a clamping frame about the periphery of a multiwell plate having a standard footprint, causes the apparatus to lose that footprint because the frame is naturally dimensionally larger than the multi-well plate. Thus, the multi-well plate with the bottom openings sealed (i.e., with the frame attached) cannot be fitted within the holders of such instruments as automated dispensing equipment that are designed to hold an object that is no larger than the size of the multi-well plate itself.

Another problem is that the outlets at the bottom of the wells are simply holes. There is no provision for a directing nozzle or other structure to be present at the bottom of each well that would enable effluent to properly drain into a collection multi-well plate. Cross-contamination and difficulty with collection into small diameter collecting vessels are highly likely with the Meyer's invention, especially during forced elution with a vacuum manifold.

Yet another problem is that there appears to be no provision made for heating of the contents of the wells. Since a "frame clamp" is used on top of the multi-well plate—"frame" indicating an open structure that rests about the perimeter of the top surface of the plate, there is nothing holding the strip-caps in place in the tops of the wells other than a friction fit. Accordingly, any significant expansion of solvent within the wells due to heating would force the caps off. Indeed, the only syntheses described in the article are carried out at 25 degrees C. (i.e., room temperature).

Still another problem lies in the use of caps themselves. Although Meyers describes the use of caps that are in the form of "eight-well strip caps" (p. 15), this still necessitates the use of twelve such strips, the caps of each of which must be individually pressed into each well to secure a tight seal. In total, 96 caps must be manipulated and dealt with during performance of a reaction sequence involving all of the wells. Not only is this awkward generally, but cross-contamination may occur if material that is splashed onto the caps inadvertently drips into other wells, or when the caps, after temporary removal, are placed back on their respective wells. Further such caps do not function as a self-sealing gasket to allow the syringed introduction of liquid materials under an inert atmosphere.

Because of the limitations associated with presently available apparatus for multiple, simultaneous synthesis, a great need still exists for such apparatus which can be used on a micro scale, which is suitable for both solid phase synthesis and for organic synthesis generally, which may be used in conjunction with batch processing type equipment, and which is simple and convenient to use.

DISCLOSURE OF THE INVENTION

Accordingly, it is an object of the present invention to provide an apparatus for multiple simultaneous chemical and biological synthesis, chromatography, separation, extraction, analysis and cell culturing on a micro scale which is simple to use, and which is more efficient and inherently capable of a greater range of operations than has heretofore been possible.

It is another object of the invention to provide such an apparatus which is suitable for general organic synthesis, including provision for heating, agitation, addition by syringe, and the like.

It is a further object to provide such an apparatus which has a standard microplate dimension and which is compatible with standard liquid handling and other batch processing equipment.

It is another object to provide such an apparatus which has independently removable upper and lower covers for sealing of the tops and bottom of a multiwell container.

It is a further object to provide such an apparatus with independently removable covers capable of sealing the tops and/or bottoms of all of the wells of a multi-well container simultaneously.

It is yet another object to provide such an apparatus which has an expedient and integral filtration capability.

It is yet a further object to provide such an apparatus that is conveniently used with a vacuum manifold for assisted elution.

It is still another object of the present invention to provide a carrier apparatus that is capable of heating and agitating multiple synthesis apparatuses simultaneously.

Briefly, the preferred embodiment of the present invention is a multi-well synthesis and filtration apparatus for performing multiple, simultaneous chemical reactions on a micro scale. The synthesis apparatus is generally comprised of a deep-well synthesis block having a plurality of nozzle-equipped wells fitted with filter disks and dimensionally arrayed in a standard multi-well format, an upper cover, a lower cover, and a pair of first and second sheet gaskets. The width and length of the covers are dimensionally approximately the same as a standard microplate footprint. The first and second sheet gaskets are interposed between the upper and lower covers, respectively, whereupon the attachment of the covers provides for a tight clamping action to seal inlet portions and outlet spouts of the wells for various reaction and manipulative purposes. Apertures in the upper cover provide that the first gasket may be punctured for introduction of materials and/or maintenance of an inert atmosphere via syringe needle.

There is also provided an alternative embodiment of the synthesis block having wells that are double in volume compared to the first embodiment but which is able to use a multi-well collection plate of the same dimensional array. In this embodiment, there are half the number of wells as compared to the original embodiment, with the wells of a rectangular shape having double the width or diameter of the original wells, but with outlet spouts that depend from the block in an off-center fashion relative to the wells. The outlet spouts are situated so as to drain effluent into every other column of wells of the collection plate. A 180 degree turn of the recycled same block or a second block of the same design provides that the remaining columns of wells of the collection plate may be utilized. An inclined bottom surface portion provides that all liquid properly drains to the outlet spouts.

Once a synthesis reaction has been carried out, a vacuum manifold apparatus is provided to forcibly elute liquid material from the wells as necessary for workup and washing. The manifold apparatus includes a base, a removable lid, a first gasket, a second gasket. The base has an open chamber sized to receive a collection plate and an outlet for applying a reduced pressure to the chamber. The lid has an open area bounded by a shelf. The first and second gaskets have a generally rectangular band shape such that the first gasket is interposable between the base top surface and the lid, and the second gasket is interposable between the shelf and the lower surface perimeter of the synthesis block. With the block located upon the shelf, thereby covering the open area of the lid, a vacuum can be created within the chamber to draw material from the wells and into the collection plate.

For actual performance of a synthesis reaction, a carrier apparatus and a modified incubator oven assembly are provided to enable agitation and heating of multiple ones of the synthesis blocks simultaneously. The carrier apparatus is generally comprised of a platform, a plurality of containment arm assemblies, and a rotation assembly. The platform is open and compartmentalized, and further has a dual-sided nature. The rotation assembly includes a shaft which extends from each end of the platform, one end of the shaft having an engagement head. An oven drive mechanism, which includes a slotted bearing cup to receive the engagement head, rotates the shaft. The synthesis apparatuses are held in cage-like fashion upon one or both sides of the platform during rotation by the containment arm assemblies. In the preferred embodiment, heating and agitation of as many as four of the synthesis apparatuses are permitted simultaneously.

An advantage of the present invention is that the upper and lower covers may be independently attached to and removed from the synthesis block as needed. Thus, for example, reagents and materials may be conveniently added to the wells by removal of a single (upper) cover. On the other hand, during such removal, leakage of material from the outlet spouts is prevented by the attached lower cover. A securely attached upper cover causes liquid material to be retained (by a partial vacuum effect) when the lower cover is removed for transfer of the synthesis block to a vacuum manifold for filtration, among many other examples of benefits provided by such an independent cover system.

Another advantage of the invention is that the provision of securely clampable upper and lower covers allows for heating of the wells (or vigorous agitation) without loss of solvent.

A further advantage is that the design of the synthesis block and cover arrangement provides for a footprint of the same size as a standard multi-well plate-with respect to either the block alone, or the block when fully covered, thereby permitting use of standard liquid handling and other batch processing equipment.

Yet another advantage is that the sheet gasket arrangement and an upper cover which has apertures allows for introduction of materials via syringe and also for a gas inlet (via needle-equipped tubing) for provision of an inert atmosphere.

Yet a further advantage is that the synthesis block is integrally moldable, inexpensive, and disposable.

Still another advantage is that the use of individual filter frits, as compared to some prior art multi-well filtering arrangements which use a sandwiched filter sheet, prevents wicking and cross-contamination between wells.

These and other objects and advantages of the present invention will become clear to those skilled in the art in view of the description of the best presently known mode of carrying out the invention as described herein and as illustrated in the several figures of the drawings.

DESCRIPTION AND BEST MODE OF THE INVENTION

Figure 1:
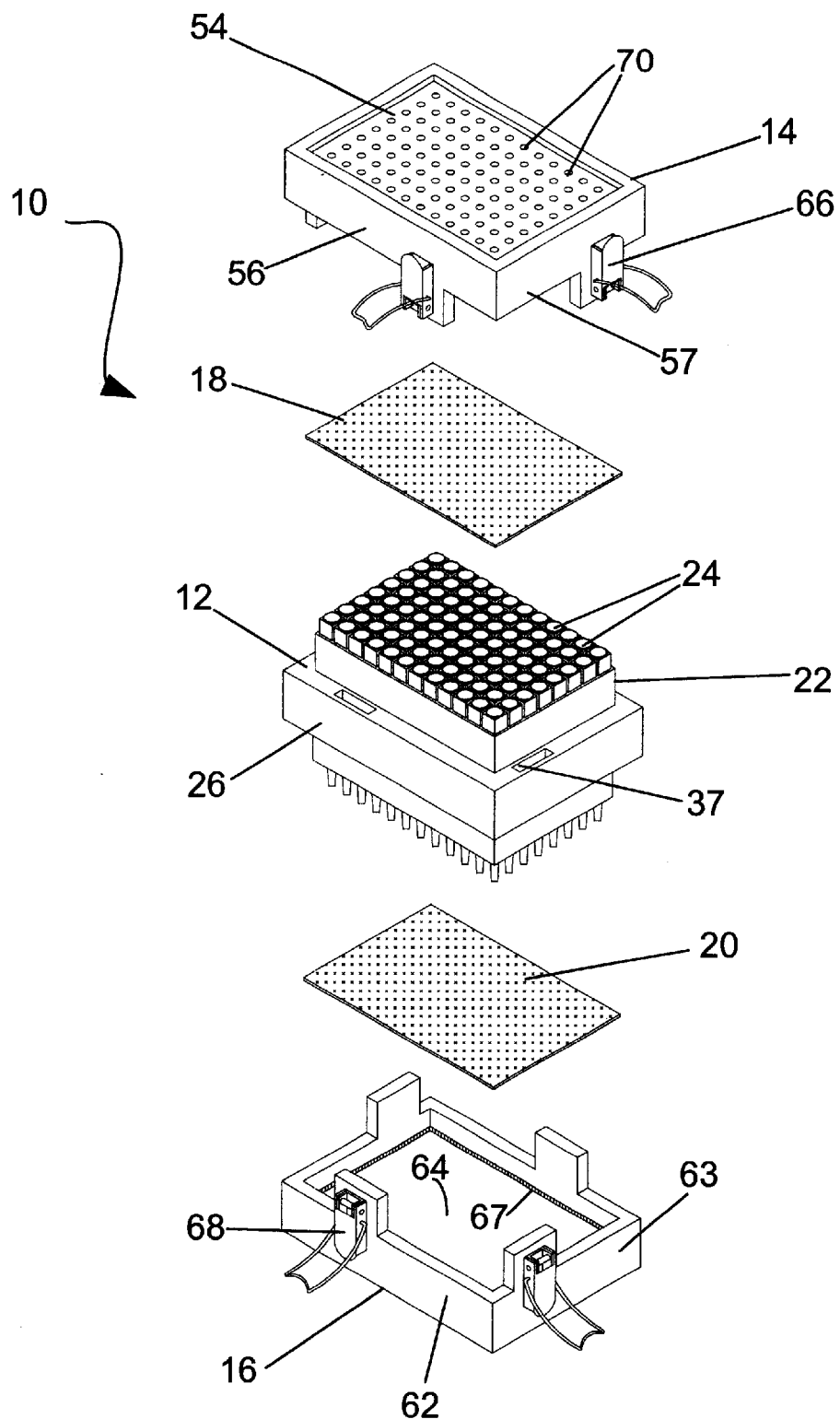
FIG. 1 is an exploded perspective view of the synthesis apparatus of one embodiment of the present invention.

The preferred embodiment of the present invention is a combination multi-well synthesis and filtration apparatus for performing multiple, simultaneous chemical reactions and workups on a micro scale. The synthesis apparatus of the preferred embodiment is directed toward solid phase organic synthesis and is set forth in FIGS. 1 and 2, where it is designated therein by the a general reference character 10.

Figure 2:
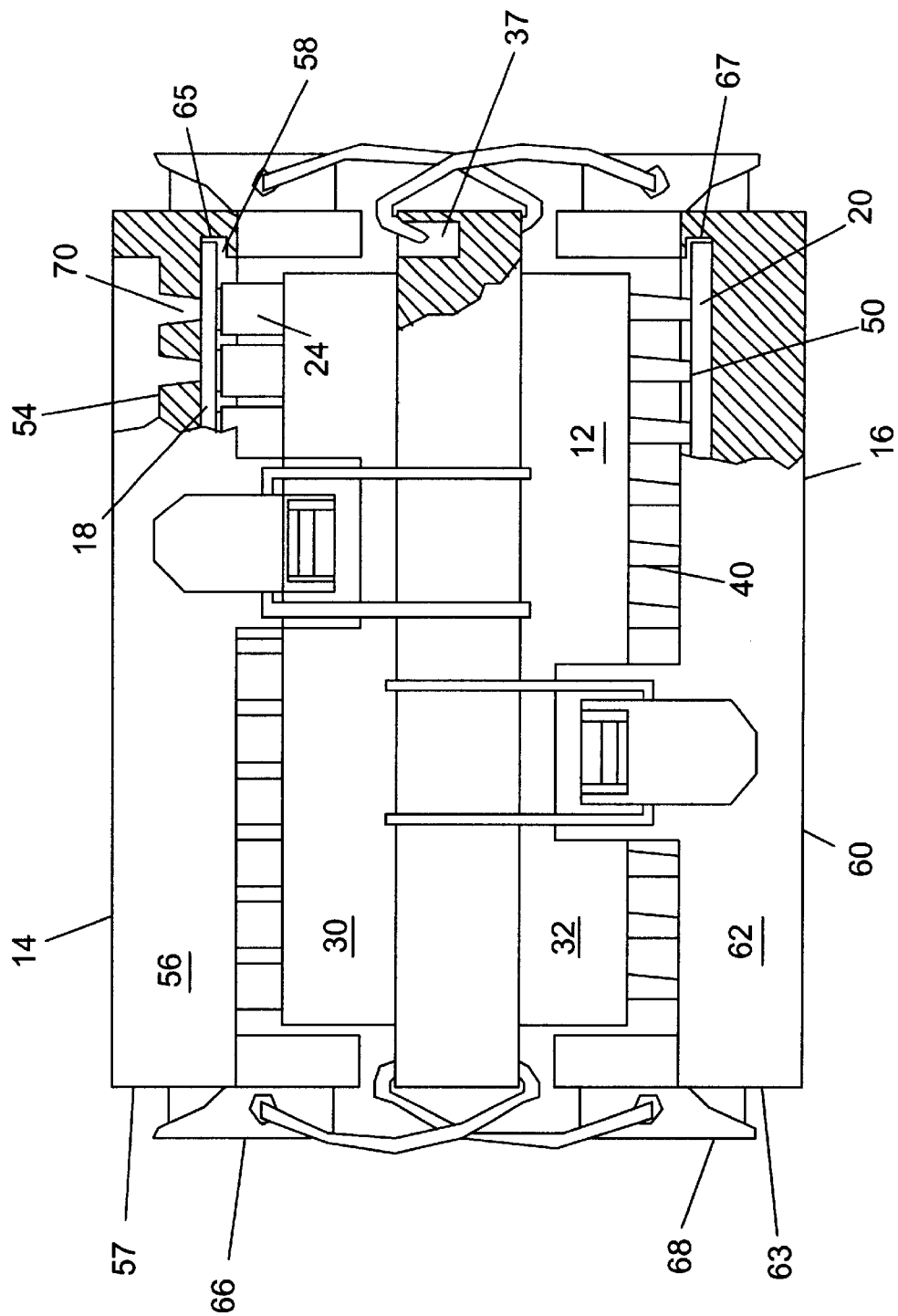
FIG. 2 is a partially cutaway, side elevational view of the synthesis apparatus of FIG. 1.

Referring initially to the exploded perspective view of FIG. 1 and also to the side elevational view depicted in FIG. 2 of the drawings, the synthesis apparatus 10 is shown to be generally comprised of elements of three major types. Thus, present are a deep-well synthesis block 12, an upper cover 14, a lower cover 16, and a pair of first and second sheet gaskets 18 and 20, respectively, which are disposed between the covers (14 and 16) and the synthesis block 12 as indicated. By a tight clamping action of the upper and lower covers (14 and 16) upon the synthesis block 12 (see FIG. 2), these primary elements together effectively provide a multiplicity of micro-vessels for "one-pot" chemical reactions and workup procedures, as will be explained in greater detail below.

Figure 3:
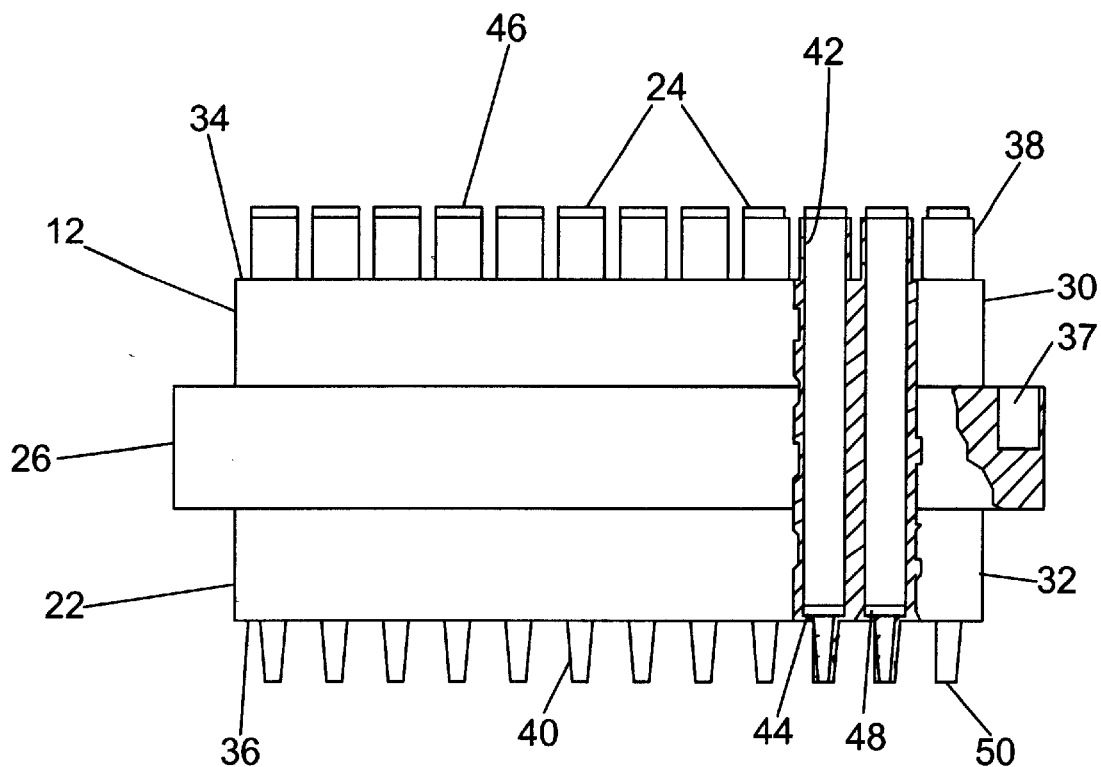
FIG. 3 is a partially cutaway, side elevational view of the synthesis block of the present invention.

Continuing to refer to FIG. 1, with reference now also to the side elevational view of FIG. 3 of the drawings, the synthesis block 12 is shown to incorporate a block body 22, a plurality of reaction wells 24, and a laterally protruding skirt 26. Each of the foregoing named elements are integrally fashioned together as a molded plastic piece. As the designated name suggests, the synthesis block 12 has a generally rectangular block shape.

As shown in FIG. 3, the skirt 26 is disposed midway about the portion of the periphery of the block body 22 that is vertically extending (i.e., the sides). For reference purposes only, the skirt 26 may be considered to "divide" the block body 22 into an upper block portion 30 and a lower block portion 32. The upper block portion 30 includes what is denoted herein as a block body upper surface 34, while the lower block portion 32 includes a block body lower surface 36.

Figure 4:
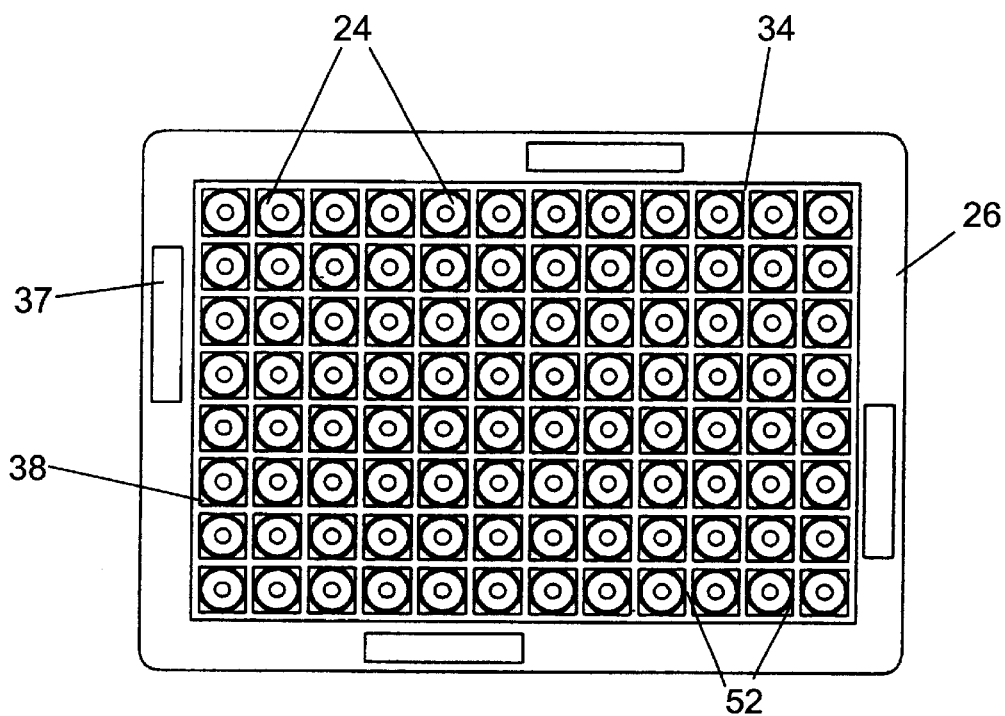
FIG. 4 is a top plan view of the synthesis block of FIG. 3.
Figure 5:
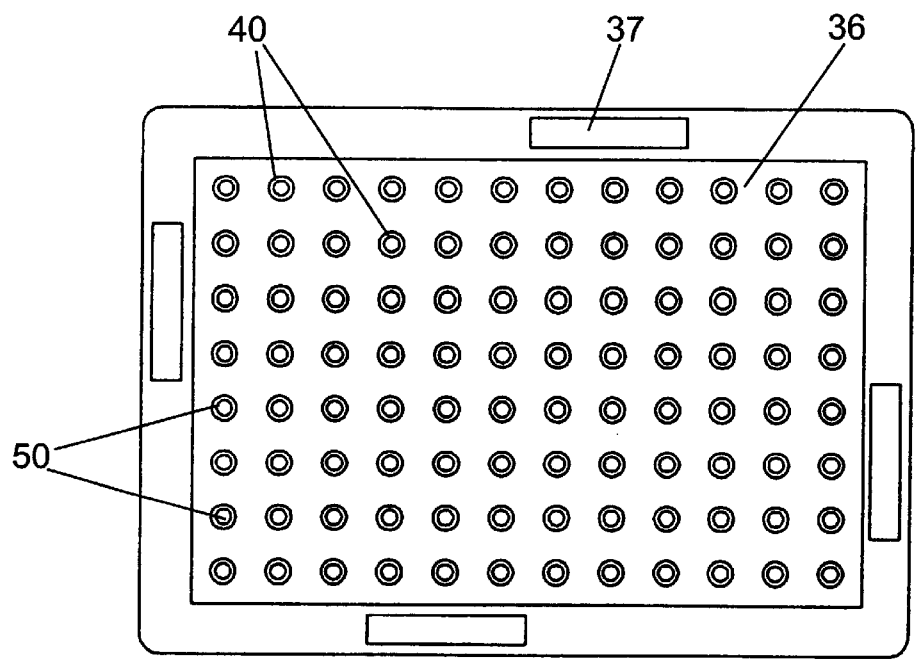
FIG. 5 is a bottom plan view of the synthesis block of FIG. 3.

As also shown in the top and bottom elevational views of FIGS. 4 and 5, respectively, the skirt 26 includes a number of vertically extending indented grooves or cutouts 37. As will be described below, the skirt 26 and cutouts 37 provide the sites of attachment upon the synthesis block 12 for both the upper and the lower covers (14 and 16).

The reaction wells 24 are tubular structures which are vertically disposed within the block body 22 and, in the illustrated preferred embodiment, are arrayed in a rectangular, 8×12 format. Such a 96-well array, with specific (i.e., 9 mm) center-to-center spacing, has become a standard in the industry for various of the multi-well plates that are now generally available. The overall dimensional area of the synthesis block 12, including the lateral extension of the skirt 26, also provides for a footprint of the same size as these standard 96-well plates, thereby permitting interchangeable use of the synthesis block 12 with standard equipment holders, automated well washers and the like. It should be apparent, however, that the present invention might employ any of a variety of arrays other than an 8×12 format, and the array format need not even be rectangular. One such alternative array, which affords an additional unique capability, is described later below.

Referring to FIG. 3, each of the wells 24 includes as a primary element an inlet portion 38, an outlet spout 40, and a tube bore 42, the length or height of the latter being determined from a well bottom 44 up and through the inlet portion 38 and to a well rim 46. The inlet portion 38 extends upward from the block body upper surface 34, while the outlet spout 40 depends from the block body lower surface 36. Again, each of the inlet portion 38, the outlet spout 40, and the tube bore 42 are structures that are integrally fashioned together with the block body 22 during the molding or fabrication process.

Figure 3A:
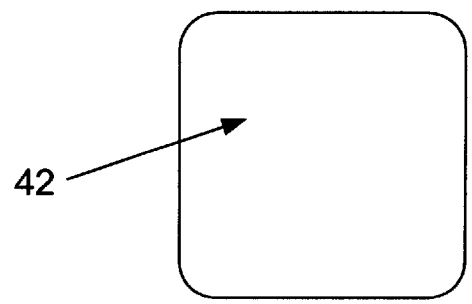
FIG. 3a is a cross-sectional view of an alternative tube bore.

Although in the primary drawing figures, the tube bores 42 are shown as having a cylindrical shape (i.e., a circular cross-section), it is expected that a tube bore 42 having a rounded square cross-sectional geometry will be employed and, indeed, may be favored (see FIG. 3*a*). Such a square container shape allows for a greater well volume as compared to a circular one. Rounding the corners of such a square container shape decreases undesirable wicking which would otherwise be prone to occur with internal corners that are acutely fashioned.

Continuing to refer to FIG. 3, each well bottom 44 is in flow-through communication with a respective discharge or outlet spout 40 and simultaneously provides a seat for a filter disk 48. The filter disks 48 are circular frits made of glass or plastic which are press-fitted into each well bottom 44. The filter disks 48 enable the wells 24 to have a resin-retaining ability during solid phase reaction synthesis and a filtration capability as necessary to elute solution and solvent from the resin support during subsequent work-up procedures.

Now also referring to FIG. 5, the outlet spouts 40 each include an orifice 50 and incorporate the well-known, slightly tapered "Luer-tip" shape that is suitable for attachment of standard laboratory syringe needle hubs. Such a needle attachment might be used, for example, where a smaller effluent orifice is desired for elution of a very small amount of solution from within the wells 24, or where a cannulated type transfer of sensitive product-containing solution under an inert atmosphere is desired. Further, this nozzle shape provides a directed stream and prevents wicking and cross-contamination of eluted material.

In the illustrated embodiment of FIGS. 1 and 4, the inlet portions 38 are seen to be delineated into square block-shaped structures and are separated from one another by a series of orthogonally intersecting rifts 52. The rifts 52 are narrow voids that extend vertically from the block body upper surface 34 to the tops of the inlet portions 38. These rifts 52 fulfill the important function of preventing liquid migration of solutions between the wells 24 in the event of spillage or jostling of the synthesis block 12 when the first sheet gasket 18 and upper cover 14 are not in place.

As shown in FIG. 3, the well rims 46 are presented at the top of the inlet portions 38 and comprise a distinct element. The well rims 46 have the appearance of a cylindrical tube shape of small height. This round, thin-walled shape tends to provide a better seal when the first sheet gasket 18 is pressed down upon the well rims 46 by the action of the upper cover 14, as compared to a wider, planar surface which would be presented by the square block shape that comprises most of the inlet portion 38 were these well rims 46 not present.

It should be apparent that the entirety of the inlet portions 38 might in fact be round (or some other shape) and thin-walled such that a specially delineated well rim such as 46 would not be present, although there may be some loss of sturdiness.

Figure 6:
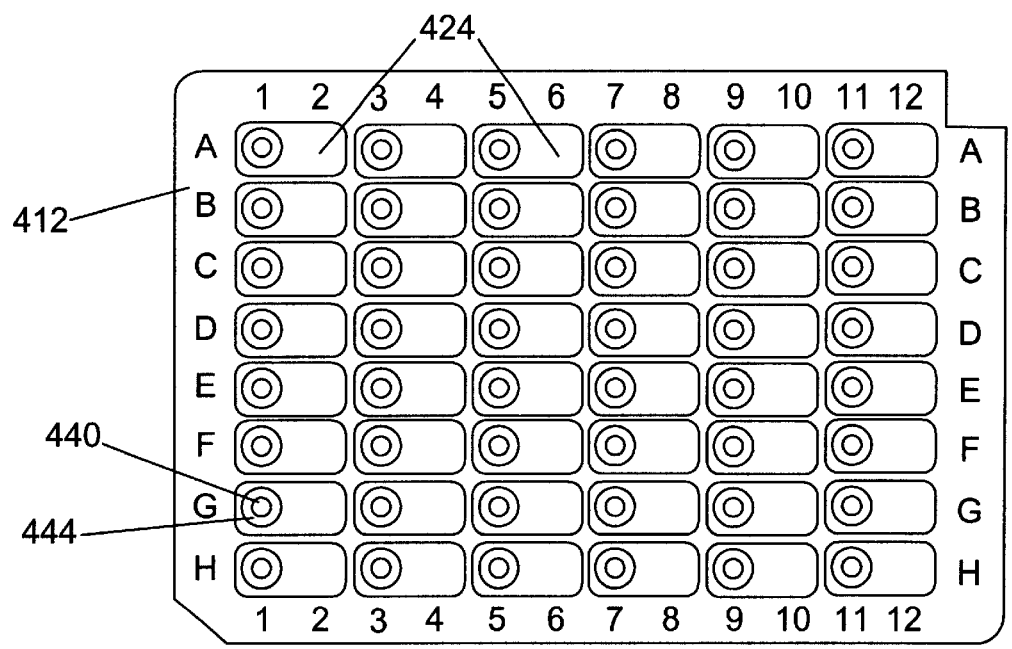
FIG. 6 is a top plan view of an alternative synthesis block.
Figure 7:
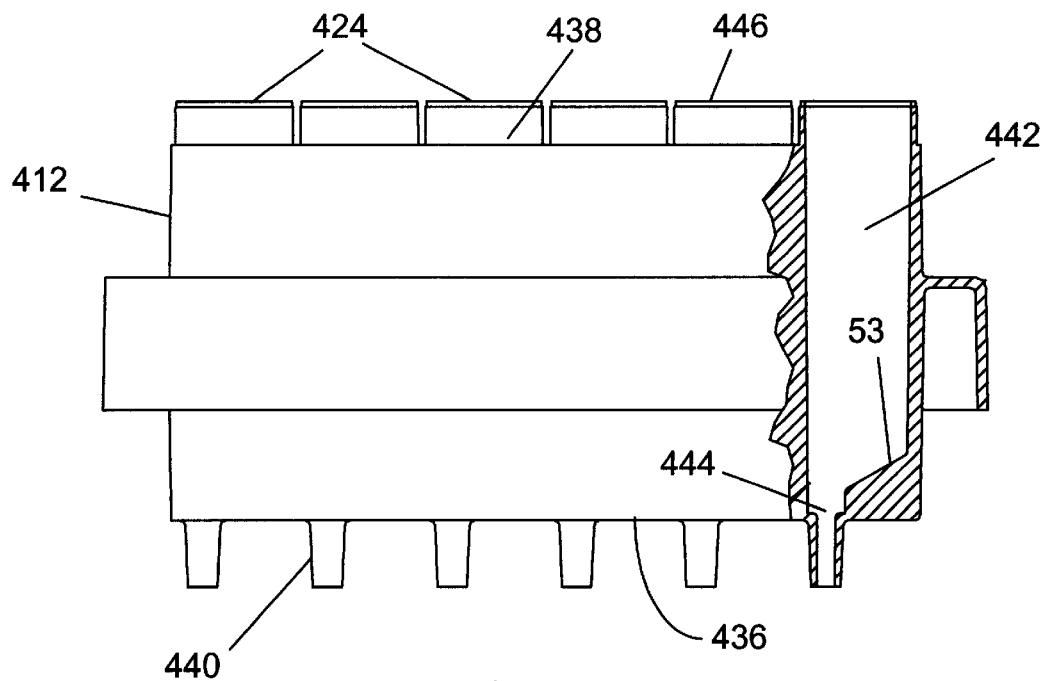
FIG. 7 is a partially cutaway, side elevational view of the alternative synthesis block of FIG. 6.

Referring now to FIGS. 6 and 7 of the drawings, there is provided an alternative synthesis block 412 which is fundamentally similar to the previously described synthesis block 12 but which provides for reaction wells 424 that are double in size compared to reaction wells 24. However, the wells 424 are configured such that the block 412 not only retains the same footprint size as the block 12, but is also able to use the same standard 96-well plate that is used with the block 12 for collection purposes (see more on the preferred collection technique later below). (In FIGS. 6 and 7, to the extent those elements of the alternative synthesis block 412 are identical or substantially similar to those appearing in the first embodiment block 12, those elements will be referred to by a reference number which incorporates the original reference number prefaced with the digit "4.")

The reaction wells 424, are arrayed in a rectangular, 8 row×6 column format, and, accordingly, total 48 in number. The wells 424 have inlet portions 438, tube bores 442, and well rims 446 which are all of a rectangular crosssectional shape with a length that is approximately double the width (diameter) of the corresponding elements found in the wells 24. (It would be apparent that the reaction wells 424 might have an oval tubular shape, as opposed to a rectangular one; this would decrease the well 424 volume obtainable for a given size of synthesis block 412, however.)

Importantly, outlet spouts 440 depend from block body lower surface 436 in an off-center fashion relative to the tube bores 442. In fact, the outlet spouts 440 are situated such that the spouts 440 of each column of wells 424 are capable of alignment with every other column of wells present in a standard 96-well plate. This means that during collection of the liquid material contained within the wells 424, one synthesis block 412, oriented with the outlet spouts 440 at the "left" side of the tube bores 442, as shown in the drawings, can be caused to empty the contents of those wells 424 into the odd numbered columns of the wells of the multi-well plate used for collection. Subsequently, if desired, the contents of the wells 424 of an identical second synthesis block 412 (or the wells 424 of the first block 412 where the block has simply been reused) can be eluted into the even numbered columns of the wells of the same collection plate by simply turning the second block 412 180 degrees (such that the outlet spouts 440 would now have the appearance of being situated at the "right" side of the tube bores 442). The total eluted contents can then be conveniently manipulated and processed as necessary in the single collection plate. Thus, a mechanism has been provided by which reaction and analysis procedures can be carried out on a larger scale in the 48-well block 412 while employing the same collection equipment—including the same standard 96 multi-well plate—that is used with the 96-well block 12 (again, collection is detailed later below).

Referring now to the cross-sectional view of FIG. 7, so that the entire contents of each larger volume well 424 can be obtained upon elution, and more particularly in view of the off-set nature of the outlet spouts 440, an angled or inclined bottom surface portion 53 is present to cause all of the liquid material present within the tube bores 442 to drain to well bottoms 444 and out of the outlet spouts 440 (a filter disk which would correspond to filter disk 48 is omitted from the drawing).

The synthesis block 12 (and including block 412) of the embodiment 10 is integrally formed by conventional injection molding, with the preferred injection material being polypropylene plastic. It would be apparent that other molding processes, and machining, etc., are also viable production processes. It would also be apparent to one with ordinary skill in the art that the synthesis block 12 might be formed from other thermoplastics, e.g., Teflon®, and from other sufficiently inert materials such as glasses, metals, and other types of resins as well. The block 12 might also be made from a combination of materials permanently or removably joined or fitted together, e.g., glass for the wells 24 and plastic for the remainder of the block body 22.

Referring again to FIG. 2, when it is desired that the wells 24 retain solution, i.e., that liquid not be permitted to flow out of the outlet spouts 40, which will naturally be the case when the wells 24 are filled with solution and reagents for synthesis, the second sheet gasket 20, in conjunction with the lower cover 16, is used to simultaneously seal the orifices 50 of each of the outlet spouts 40. (In this and the following descriptions, it is understood that synthesis block 412 might be interchangeably employed with block 12.)

Likewise, and as also shown in FIG. 2, during syntheses in which the synthesis block 12 is subjected to agitation or rotation, as will virtually always be employed to achieve an efficient reaction process, and during heating of volatile solvents, the first sheet gasket 18, in conjunction with the upper cover 14, is used to simultaneously seal down upon the well rims 46 and thus prevent loss of liquid material from the tops of the wells 24.

Referring to FIG. 1 in addition to FIG. 2 now, the upper cover 14 is shown to include a recessed top surface 54, pairs of opposing vertical outer side surfaces 56 and outer end surfaces 57, and a planar inner surface 58 (see FIG. 2). Correspondingly, the lower cover 16 includes a bottom surface 60, pairs of opposing vertical outer side surfaces 62 and outer end surfaces 63, and a planar inner surface 64.

The inner surfaces (58 and 64) of the upper and lower covers (14 and 16) each extend into shallow recesses 65 and 67, respectively. The recesses (65 and 67) provide that the first and second sheet gaskets (18 and 20) may be inserted therein in order to hold the sheet gaskets (18 and 20) in proper position with respect to the wells 24 for the aforementioned sealing purposes. The recesses (65 and 67) permit an easier manipulation of the covers (14 and 16) and sheet gaskets (18 and 20) upon the synthesis block 12 in general. It would be apparent that laterally projecting nubbles or other similarly intermittently overhanging structures might be used to retain the sheet gaskets (18 and 20) rather than the continuously fashioned recesses (65 and 67).

Still referring to FIGS. 1 and 2, present upon each of the pairs of outer side and end surfaces (56 and 57, and 62 and 63) of the upper and lower covers (14 and 16) are lockable latches or clips 66 and 68, respectively. When the covers (14 and 16) are positioned on the synthesis block 12, these clips (66 and 68) are situated so as to be in vertical alignment with the cutouts 37 that are present within the protruding skirt 26. Thus, insertion of the clips 66 and 68 into the cutouts 37 (FIG. 2) ensures that the covers (14 and 16) are properly aligned when attached to the synthesis block 12. As shown, the clips (66 and 68) (and cutouts 37) are located in an offset fashion such that the clips 66 of the upper cover 14 do not interfere with the clips 68 of the lower cover 16 when both are latched onto the skirt 26.

It would be apparent that, rather than employing cutouts 37, tab-type structures located on the skirt 26 could be employed onto which a suitable type of clip could be latched. It would also be apparent that an arrangement other than a continuous skirt 26 might be used for attachment of the clips (66 and 68). Individual, distinct structures protruding about the periphery of the synthesis block 12 might simply be used ("periphery" meaning at least either the sides of the synthesis block 12, upon which the skirt 26 is presently located, and/or the perimeters of the block body upper and lower surfaces (34 and 36)). Further, an offset clip arrangement can be avoided by incorporating two levels of such skirts or protruding structures, or by locating cutouts for a slightly modified type of clip in the sides of a single skirt such as skirt 26, etc.

When the clips (66 and 68) are latched upon the skirt 26, a secure attachment of the upper and lower covers (14 and 16) upon the synthesis block 12 is achieved. This attachment provides a liquid tight seal because of the tight sandwiching of the first and second sheet gaskets (18 and 20) between the upper and lower covers (14 and 16) and the well rims 46 and outlet spouts 40, respectively. The seal is sufficient to allow for agitation or inversion of the synthesis apparatus 10 and moderate heating of volatile solvents without loss of liquid material.

Importantly, the employment of the skirt 26 as an attachment site provides that the two covers (14 and 16) may be independently removed from the synthesis block 12 as necessary for reaction purposes and workup, as opposed, for example, to a threaded rod-type clamping arrangement of such covers (14 and 16) in which the same clamping means would be used to hold the two covers (14 and 16) simultaneously onto such a container as the block 12 and whereby the versatility of the apparatus 10 afforded by independently removable covers (14 and 16) might otherwise be limited. Again, other attachment structures for a clip or related fastening device could serve to provide for the novel ability of the present invention to allow for such independent cover removal.

Additionally, the design also provides that the two covers (14 and 16) may each have a footprint that is dimensionally the same as a standard multi-well microplate and with no interfering structures to prevent placement of the synthesis block 12 with the covers (14 and 16) attached into the holders of automated equipment designed for standard microplates.

With continued reference to FIGS. 1 and 2, it will be noted that the upper cover 14 includes, in addition, an array of uniformly spaced perforations or holes 70 which extend completely through the cover 14 and open onto both of the top and inner surfaces (54 and 58). The holes 70 are arrayed so as to permit axial alignment with the wells 24. As shown in the cut-away aspect of FIG. 2, the holes 70 are tapered top to bottom.

The holes 70 allow for the introduction (and/or removal) via syringe of reagents and liquid materials as necessary to perform the particular synthesis or procedure. The needle of a syringe simply enters the upper cover 14 through a hole 70 and penetrates the first sheet gasket 18 whereupon the syringe needle is located within a well 24 and liquid material can then be dispensed (or decanted). The tapered design of the holes 70 helps insure that the syringe needle does not stray and miss entry into the desired well 24. The holes 70 also allow for the provision of introduction and/or maintenance of an inert atmosphere via needle-fitted tubing drawing from a nitrogen gas or argon gas source.

The covers (14 and 16) are made of high strength, anodized aluminum alloy, but other sturdy, non-corrosive materials suitable for laboratory environs, such as stainless steel, may be employed as well. The first and second sheet gaskets (18 and 20) are made of the chemical resistant rubber materials as are well known to be used for forming septa for sealing the round-bottomed and Erlenmeyer flasks and other containers commonly used by researchers, e.g., Viton® and Santoprene®. The nature of this rubber material provides that upon puncturing and withdraw of a syringe needle, a sufficiently good seal for most reaction purposes is still maintained despite the puncturing. Such rubber materials may also be in the form of laminates as well.

Referring now to FIGS. 8, 9, 10 and 11 of the drawings, there is provided an alternative synthesis apparatus 310 which is now actually most preferred. The alternative synthesis apparatus 310 is very similar to the previously described synthesis apparatus 10, but additionally includes a reinforcement assembly 372 to improve the clamping action of the covers (314 and 316) upon the synthesis block 312 in order to better prevent leakage or escape of solvent. (In FIGS. 8–11, to the extent those elements of the alternative synthesis apparatus 310 are identical or substantially similar to those appearing in the original embodiment 10, those elements will be referred to by a reference number which incorporates the original reference number prefaced with the digit "3." )

Figure 8:
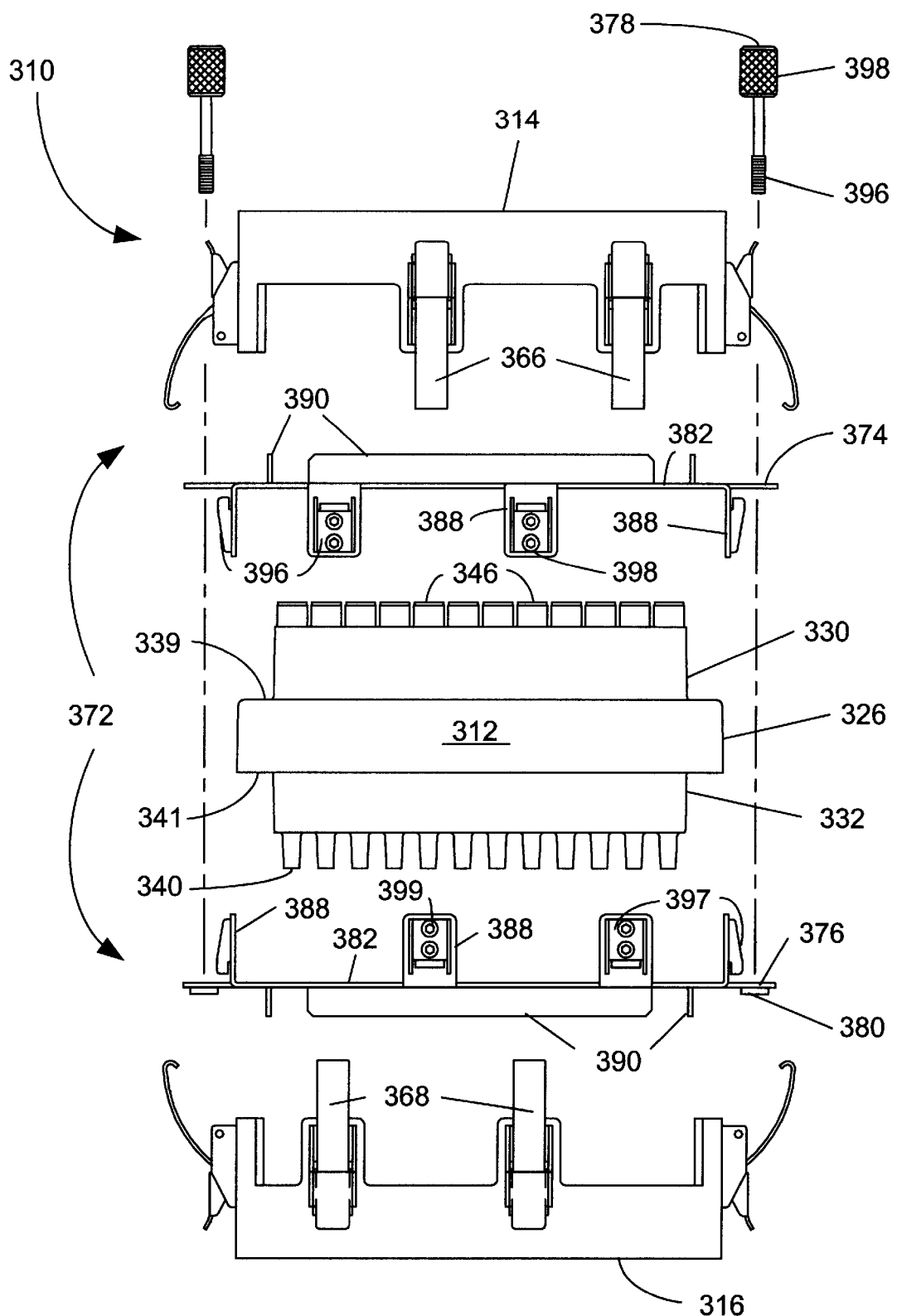
FIG. 8 is an exploded side elevational view of an alternative synthesis apparatus (now preferred)
Figure 9:
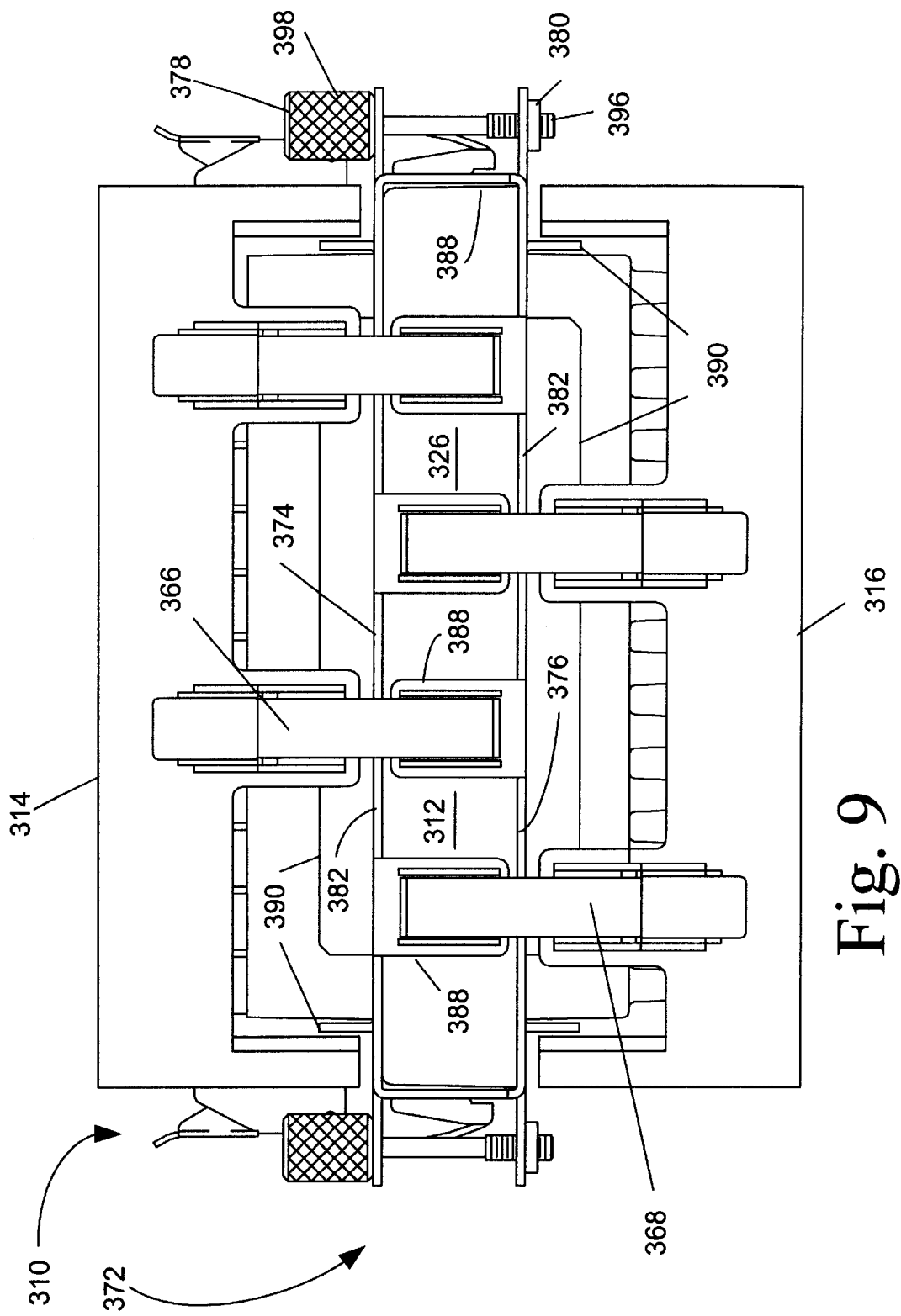
FIG. 9 is a side elevational view of the alternative synthesis apparatus of FIG. 8.
Figure 10:
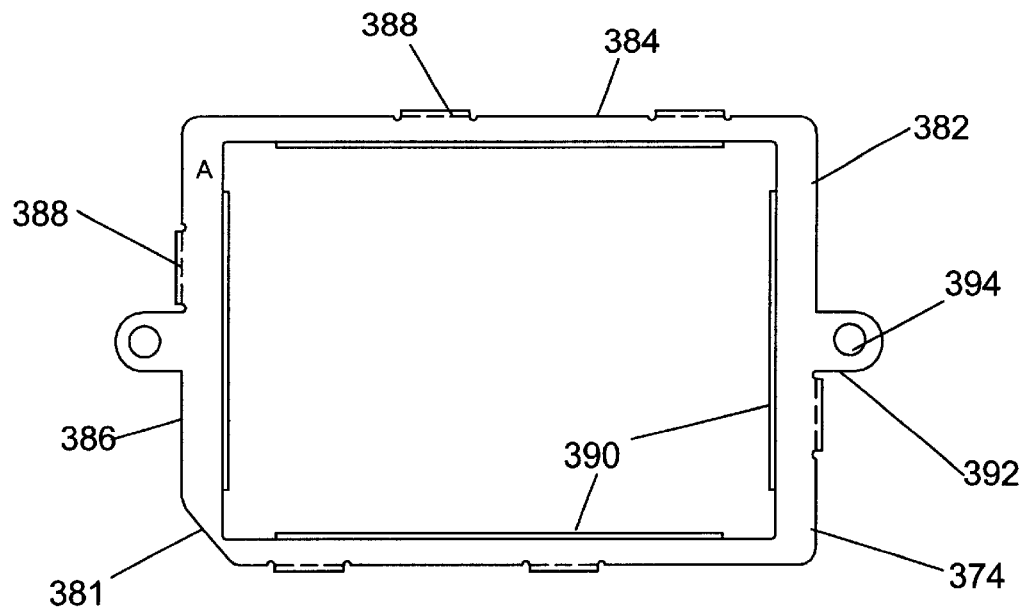
FIG. 10 is a top view of the upper collar of the alternative synthesis apparatus of FIG. 8.
Figure 11:
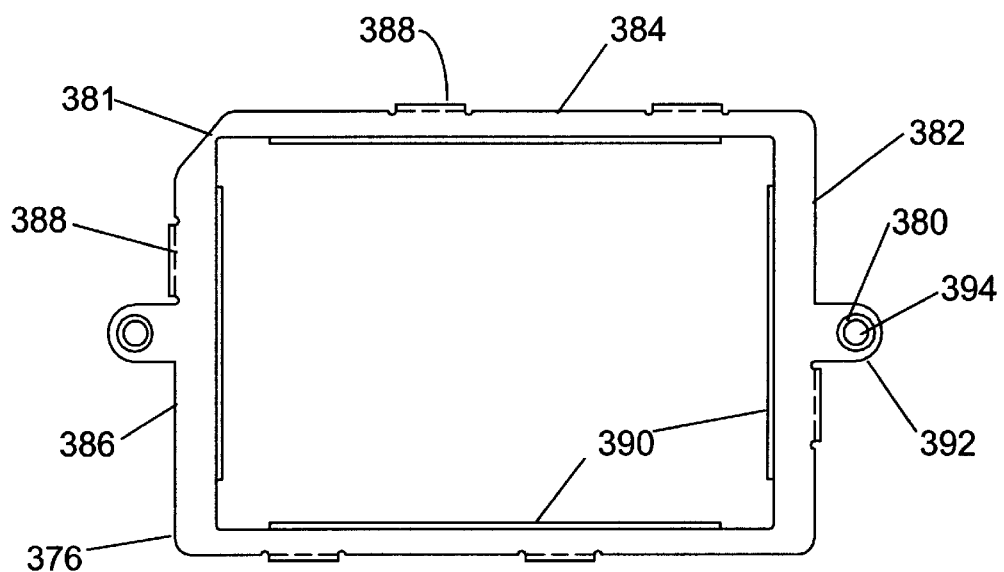
FIG. 11 is effectively a bottom view of the lower collar of the alternative synthesis apparatus of FIG. 8.

With reference to the exploded side elevational view of FIG. 8 and also the side elevational view of FIG. 9, the reinforcement assembly 372 includes an upper collar 374, a lower collar 376, and a pair of finger screws 378. The upper and lower collars (374 and 376) are identical, except that the lower collar 376 further includes a pair of stationary nuts 380 for tightenably receiving the finger screws 378. The interaction of the finger screws 378 and nuts 380 is described below. (As shown in the views of FIGS. 10 and 11, each collar (374 and 376) also includes a cutout 381, which is used for alignment purposes to make more obvious the assembly of the components of the apparatus 310. Thus, in this respect, the collars (374 and 376) bear a mirror image relation to one another as opposed to an identical one.)

Each collar (374 and 376) includes a collar body 382 in the form of a flat, substantially rectangular portion having a large central open area sized to closely receive and fit about the upper and lower block portions (330 and 332) of the synthesis block 312. Each collar body 382 includes a pair of opposing sides 384 and ends 386. In use, the collar bodies 382 flushly contact either an upper or lower skirt surface (339 or 341), as the case may be, and have a footprint (i.e., perimeter and inner edge outlines) to match those surfaces (339 and 341).

Located at the perimeter edges of each collar body 382, and integrally formed therewith, are six catch support members 388 which are formed to extend in a unidirectional orthogonal orientation relative to the plane defined by the collar body 382. Two pairs of catch support members 388 are located at the sides 384 while one pair is located at the ends 386. As between the two sides 384 or the two ends 386, the catch support members 388 bear a facing, offset relation. As between each upper and lower collar (374 and 376), the catch support members 388 are also located in an offset fashion so as not to interfere with one another when both collars (374 and 376) are attached to the skirt 326 and to the covers (314 and 316) as will be described. (Note: In FIG. 8, the catch support members 388 and corresponding cover portions located on the far side of the drawing are omitted for clarity.)

Located at the inner edge of each collar body 382, and also integrally formed therewith, are four flanges 390 which are similarly formed to extend in a unidirectional orthogonal orientation relative to the plane of the collar body 382, but on an opposite side of the plane from the catch support members 388. Each flange 390 spans most of the length of the associated side 384 or end 386 and provides resistance to bending and deformation and generally makes the collars (374 and 376) more rigid.

Extending orthogonally from each end 386, but this time co-planar with the collar body 382, is additionally present an integral extension formation 392. Each extension formation 392 includes a centrally located aperture 394. It is upon the extension formations 392 of the lower collar 376, and in alignment with those 394 apertures, then, that are present the aforementioned nuts 380. In the preferred embodiment 310, the nuts 380 are attached to the extension formations 392 by electrical induction welding. It would be apparent that an integral nutlike structure might also be provided where the extension formations 392 were made to be thicker (i.e., the extension formations 392 themselves might be tapped to provide a threaded nut structure).

When the collars (374 and 376) are placed about the upper and lower block portions (330 and 332) of the synthesis block 312 as shown, the apertures 394 of the upper collar 374 are caused to be in axial alignment with the apertures 394 of the lower collar 376. Thus, a threaded end 396 of each finger screw 378 is able to be inserted simultaneously through those aligned apertures 394 and screwed into the stationary nuts 380. A knurled head 398 of the finger screw 378 is too large to pass through the apertures 394 and so is retained atop the extension formations 392 of the upper collar 374. In this manner, the collars (374 and 376) can be tightened together upon the upper and lower surfaces (339 and 341) of the skirt 326. The attachment of the reinforcement assembly 372 to the synthesis block 312 provides that the collars (374 and 376) especially the lower collar 376— will remain conveniently in place during latching and removal of the covers (314 and 316), as will be further described.

It would be apparent that a number of other attachment designs could be used to hold the collars (374 and 376) in place upon the synthesis block 312. For example, a latching arrangement, similar to that as will be further described for attachment of the covers (314 and 316) to the reinforcement assembly 372 itself, might also be used. Thus it is not intended that the attachment manner be limited to a screw and nut arrangement.

Figure 8A:
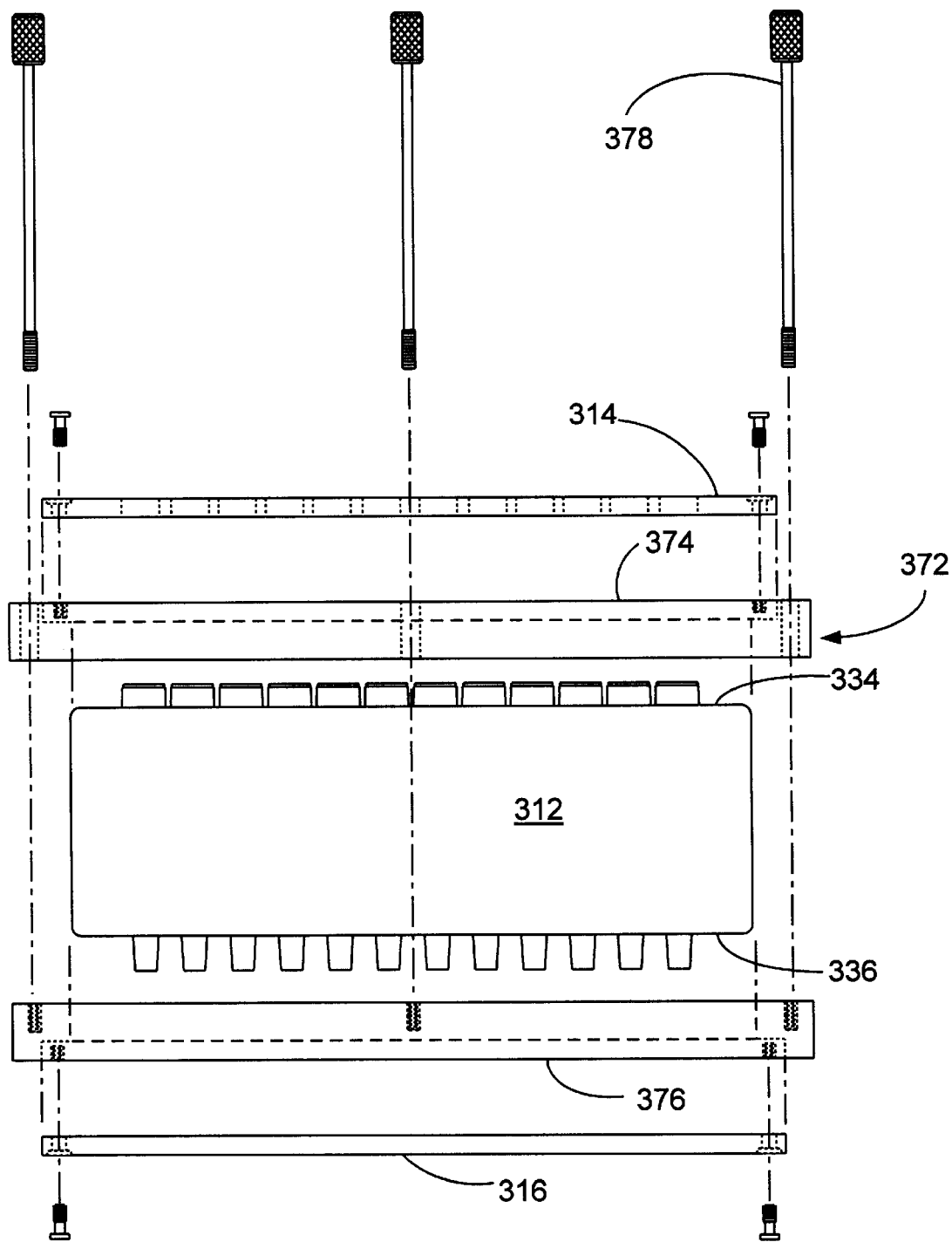
FIG. 8A is an exploded side elevational view of another alternative embodiment of the present invention.

Now referring to FIG. 8A, moreover, and analogous to what was previously described with respect to alternative sites for attachment of the covers (14 and 16) in the unreinforced embodiment 10, the reinforcement assembly 372 might not be attached to the side periphery of the synthesis block 312 (e.g., to the skirt 326), but rather to the periphery constituted by the perimeters of the block body upper and lower surfaces (334 and 336). That is to say, similar collars to 374 and 376 would rest upon those upper and lower surfaces (334 and 336). This would require longer screws or threaded rods (of the finger type, such as 378, or otherwise) to extend between such collars in order to hold them onto the block 312. Alternatively, an independent manner of affixing such collars could be used. For example, screws for each such collar could be screwed directly into the block body 322 as opposed to their extending between those collars. In any event, the covers (314 and 316) would then be attached in an independent fashion to collars (similar to 374 and 376, or otherwise) which are themselves independently held in place.

As the designated name would imply, each catch support member 388 provides a situs for attachment of a catch element 396. These catch elements 396 take the place of the previously mentioned cutouts 37 present in the skirt 26 of the earlier described synthesis block 12. In the preferred embodiment, the catch elements 396 are attached to the catch support members 388 using rivets 398. It should be noted at this point that the skirt 326 of the synthesis block 312 of the alternative embodiment 310 does not include the cutouts 37, which are made unnecessary by embodiment 310, but rather has a solid form.

When assembled as indicated in FIGS. 8 and 9, the catch elements 396 of the upper collar 374 are in vertical alignment with the fastening clips 368 of the lower cover 316. Conversely, the catch elements 396 of the lower collar 376 are in vertical alignment with the fastening clips 366 of the upper cover 314. (In the alternative embodiment 310, it will be noted that there have been provided two additional pairs of clips (366 and 368) and catch elements 396 to further enhance the sealing capability of the invention.) Thus, for sealing purposes, the clips (366 and 368) are latched onto the catch support members 388 as opposed to a direct attachment upon the skirt 326.

In the case of the earlier described embodiment 10, it was observed that the portion of the skirt 26 in close proximity to the plastic cutouts 37, and into which the clips (66 and 68) of the covers (14 and 16) are inserted for latching, would sometimes deform sufficiently during certain operations (e.g., heating at elevated temperatures) to prevent a tight seal of the sheet gaskets (18 and 20) and covers (14 and 16) upon the well rims 46 and outlet spouts 40 (please refer to the earlier drawing figures). In the alternative embodiment 310, no deformation of the skirt 326 occurs because the attachment of the covers (314 and 316) to the skirt 326 occurs indirectly via the collar bodies 382. The force of the clamping is distributed evenly and in a neutralizing fashion upon substantially the entirety of the upper and lower surfaces (339 and 341) of the skirt 326.

Importantly, the reinforcement assembly 372 still maintains what is assertedly a novel aspect of significant importance to the present invention, namely, the capability to independently remove the upper and lower covers (314 and 316) to maintain a seal upon either or both of the well rims 346 and outlet spouts 340 for reagent addition, solvent removal, etc., as needed.

It would be apparent that a skirt 326 might be provided which is of itself made of metal, or otherwise reinforced with metal such that deformation of a plastic portion would not occur. The design of the reinforcement assembly 372 as provided, however, offers the advantage that the synthesis block 312, which is intended to be disposable (or at least not infinitely reusable), may be discarded without also discarding an expensive metal component.

In the alternative embodiment 310, the components similar to those previously described are constructed from the same materials, with the collars (374 and 376) being fashioned from heavy gauge stainless steel sheet metal using conventional stamping and forming techniques.

Once a synthesis reaction or step has been carried out and it is desired that solvent be eluted from the wells or that some other filtration operation carried out, a vacuum manifold apparatus 100 is further provided for complimentary use with the synthesis apparatus 10 (understood also to include the alternative embodiment 310 from this point on).

Figure 12:
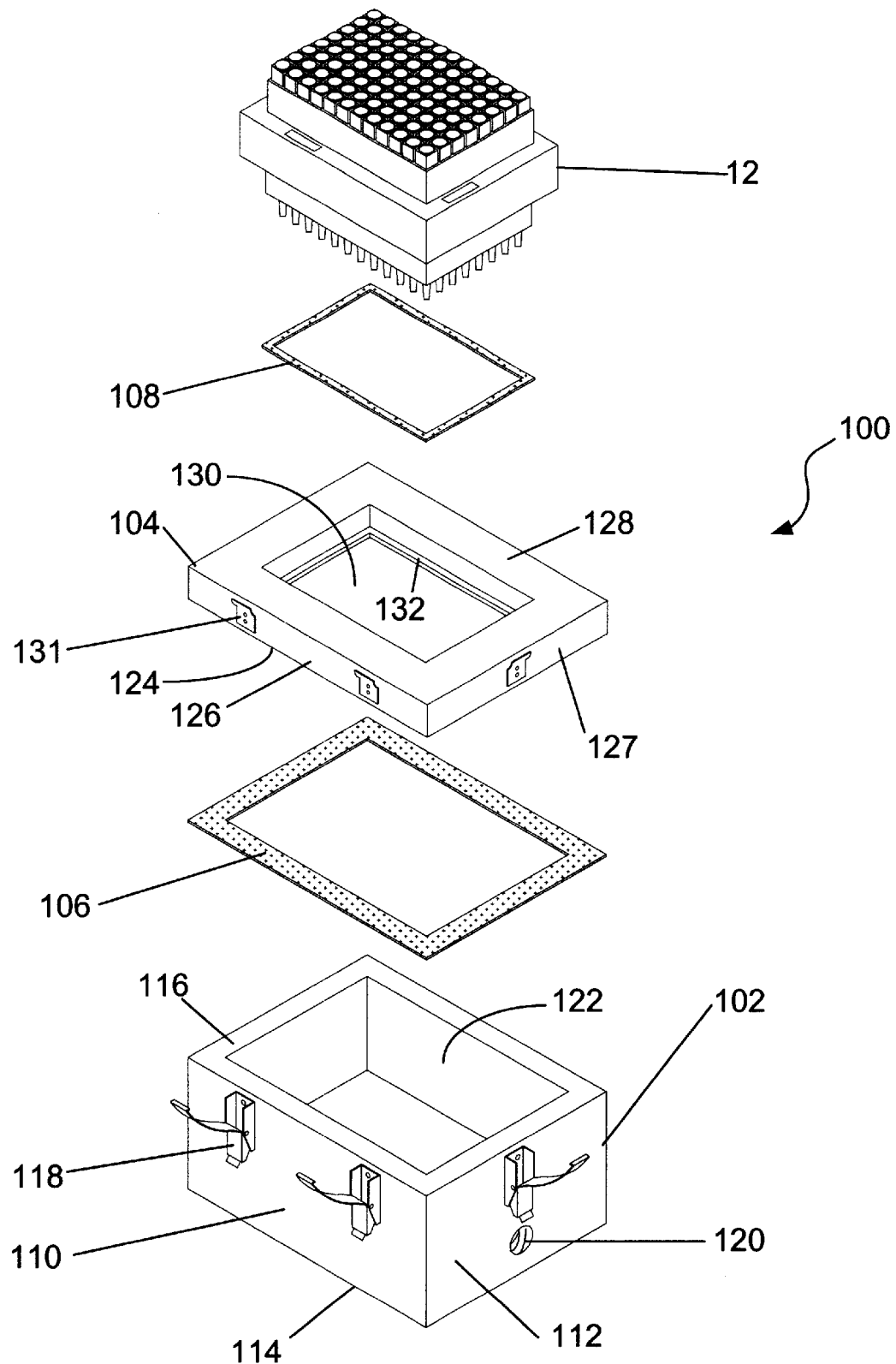
FIG. 12 is an exploded perspective view of the manifold apparatus and synthesis block of the present invention.

Referring now to the exploded perspective view in FIG. 12 of the drawings, the manifold apparatus 100 is shown to be generally comprised of a base 102, an open area lid 104, a first gasket 106, and a second gasket 108. Unlike the first and second sheet gaskets (18 and 20) of the synthesis apparatus, the first and second gaskets (106 and 108) of the manifold apparatus 100 each have a continuous rectangular band shape with a large rectangular open area, with the second gasket 108 being more narrow in width than the first gasket 106. Similar to the synthesis apparatus 10, an attachment method is used in which the lid 104 is clipped onto the base 102, with the first gasket 106 being sandwichedly interposed therebetween.

The base 102 has a rectangular box-like shape and includes opposing pairs of side walls 110 and end walls 112, and a bottom 114. Located at the top of the four walls (110 and 112) is a continuous planar lip 116 which provides a support for the first gasket 106 and the lid 104. Present on the outside of each of the side and end walls (110 and 112) are clips 118 which are similar to the clips (66 and 68) of the synthesis apparatus 10. A threaded aperture or outlet 120 for a tube fitting 121 (see FIG. 13) is located within one end wall 112, near the bottom 114, for connection to a vacuum source (not shown).

Although not depicted, for easy alignment of the gasket 106 and lid 104 upon the lip 116, the lip 116 may be provided with a number of vertically protruding alignment pins (or similar structures), and the gasket 106 and lid 104 provided with corresponding apertures or cutouts which are mateably received by those pins.

Figure 13:
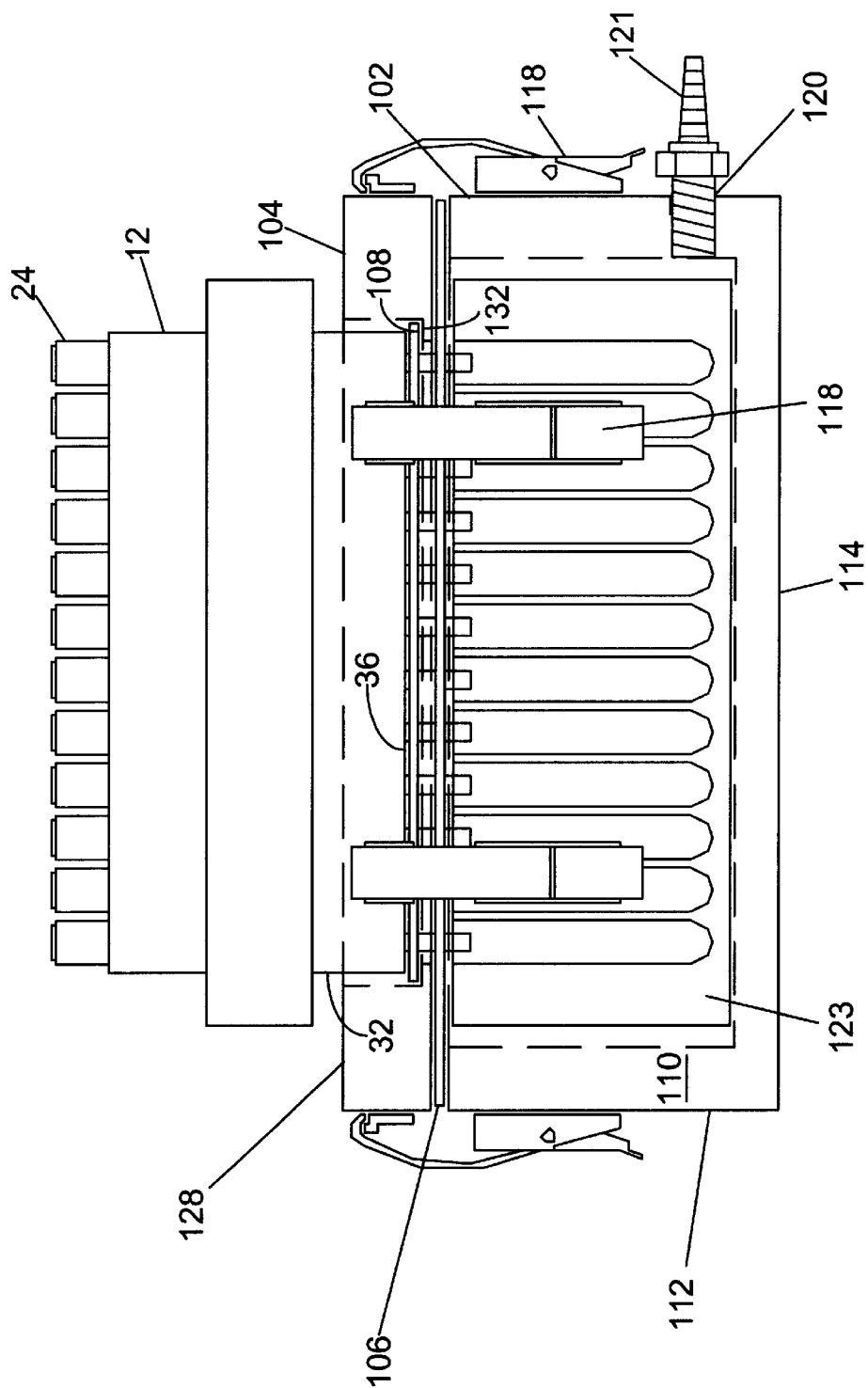
FIG. 13 is a partially transparent side elevational view of the manifold apparatus and synthesis block of FIG. 12.

Referring also now to the partially transparent view of FIG. 13, the base 102 has an interior space or chamber 122 (see FIG. 12) sized to accommodate a collection plate 123 of a dimensional area and array that is typical for a 96-well plate. The collection plate 123 may be of the deepwell variety as shown or it may be a smaller micro plate placed atop a support of appropriate height in order that effluent may be neatly received by the collection plate 123 during elution of solvent from the wells 24.

As shown in FIGS. 12 and 13, the lid 104 has a rectangular shape to match that of the base 102. The lid 104 includes a planar underside 124, pairs of opposing side surfaces 126 and end surfaces 127, an upper surface 128, and a rectangular open area 130. Included on the side and end surfaces (126 and 127) are strike or catch elements 131 which are in vertical alignment with the clips 118 of the base 102. The catch elements 131 and clips 118 together permit a secure fastening of the lid 104 upon the base 102 after the collection plate 123 has been placed within the base 102 and the first gasket 106 positioned upon the lip 116.

Along the perimeter of the open area 130 of the lid 104 is present a narrow ledge or shelf 132 which is vertically recessed from the upper surface 126. The open area 130 is sufficiently large to accept the lower block portion 32 of the synthesis block 12, while the shelf 132 functions as a stop for the synthesis block 12 by providing a support upon which the block body lower surface 36 may rest. The second gasket 108 is interposed between the shelf 132 and the perimeter of the block body lower surface 36 to enable a hermetic seal therebetween.

Not shown is that the lid 104 might also be made of two halves each having planar surfaces fittable one on top of the other in order to be capable of sandwiching a gasket similar to gasket 108—but having a greater width—therebetween. The wider gasket would extend from the shelf 132 to in between the two lid halves to be compressibly retained about the gasket perimeter. The retention causes the portion of the gasket present upon the shelf 132 to be properly seated at all times, whereas the narrower gasket 108 may, when not careful, be inadvertently dislodged.

As shown in FIG. 13, with the lid 104 in place atop the first gasket 106 and lip 116, and the synthesis block 12 in position atop the second gasket 108 and shelf 132, a vacuum tight chamber is created in which a pressure differential may be applied by a vacuum source via the outlet 120 and tube fitting 121 to forcibly elute any liquid contained in the wells 24 through the filter disks 48 and into the wells of the collection plate 123. (As noted previously, in the case of synthesis block embodiment 412, the elutions will occur into alternating columns of the wells of the collection plate 123/423.)

It should be noted that a simplified manifold apparatus 100 might also be designed in which only a base portion 102 is present with no lid 104 and supporting shelf 132. However, such would require that the synthesis block 12 have a greater than standard footprint size in order that the synthesis block 12 might span the extents between the side and end walls (110 and 112) of the base 102. As mentioned previously, the employment of a standard footprint size for the synthesis block 12 (and upper and lower covers (14 and 16)) enables the block 12 (whether covered or uncovered) to be used in a number of automated operations in which standard sized holders are also employed.

For actual performance of a synthesis reaction, a carrier apparatus and a modified oven assembly are provided to enable convenient agitation and heating of the contents of multiple ones of the synthesis blocks 12 simultaneously. Shown in FIG. 14, and designated therein by the reference number 200, is one of a variety of possible embodiments of the carrier apparatus. As will be described later, the carrier apparatus 200 is used in combination with the oven assembly 202 shown in FIG. 16 and is removably located therein.

Figure 14:
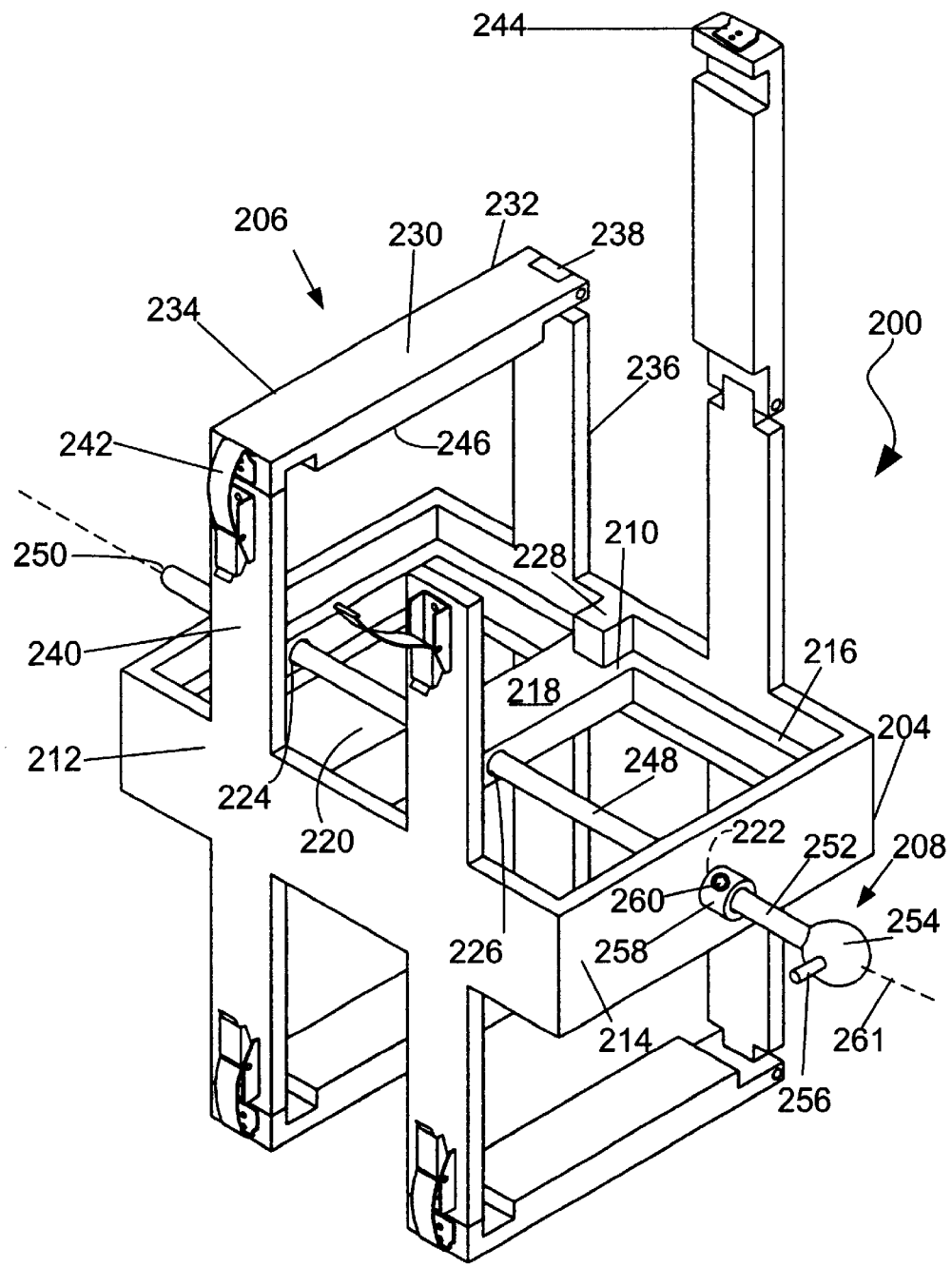
FIG. 14 is a perspective view of the carrier apparatus of the present invention.

Referring now to the perspective view in FIG. 14 of the drawings, in which the carrier apparatus 200 has been separated from oven assembly 202 (as will typically be done for loading of the synthesis blocks 12 therein), the carrier apparatus 200 is seen to be generally comprised of a tray 204, a plurality of containment arm assemblies 206, and a rotation assembly 208. It will become evident that each of these components may have a design and appearance substantially different from that depicted and still perform the novel function, as explained below, to which they are concertedly directed.

The tray 204 as shown has a compartmentalized rectangular box-like shape and includes a platform 210, and pairs of opposing side walls 212 and end walls 214. The platform 210 is comprised of a number of contiguous ledges 216 which are present about the platform 210 perimeter and a crosspiece 218 which spans the median width of the platform 210. Open areas 220 within the platform 210 reduce the amount of material comprising the carrier apparatus 200 and, more importantly, allow for a more uniform heat distribution about the synthesis apparatuses 10 when such are in place upon the platform 210 and heating is occurring within the oven assembly 202. Towards these ends, it will be apparent that the crosspiece 218 might also be eliminated.

Still referring to FIG. 14, the two ledges 216 which are present along the end walls 214, together with the crosspiece 218, each include bores or apertures 222, 224, and 226, respectively, which extend horizontally therethrough. These apertures (222, 224, and 226) are present in an in-line fashion for receipt and mounting of the rotation assembly 208. As will be described shortly, the attachment of the rotation assembly 208 permits the carrier apparatus 200 to be rotated within the oven assembly 202 so that the contents of the synthesis apparatuses 10 may be agitated and mixed during heating.

The side walls 212 and end walls 214 of the platform 210, together with separators 228, assist in lateral containment and further define two compartmentalized spaces for the location of two of the synthesis apparatuses 10. The tray 204 actually has a symmetrical, dual-sided nature. That is, the tray 204, including the platform 210, has the same appearance as shown as when the carrier apparatus 200 has been inverted (rotated) 180 degrees from the orientation of FIG. 14. Thus, and referring now to the transparent end view shown in FIG. 15, two synthesis apparatuses 10 (the alternative embodiment 310 is actually depicted) may be placed upon each side of the platform 210 to permit heating and agitation of as many as four of the synthesis apparatuses 10 simultaneously.

The synthesis apparatuses 10 are held in cage-like fashion upon one or both sides of the platform 210 during rotation by the four containment arm assemblies 206. As shown in FIG. 14, each containment arm assembly 206 includes a clasp arm 230 having a first end 232 and a second end 234. The clasp arm 230 is hingedly connected at the first end 232 to a first upright extension portion 236 via a hinge joint 238. When lowered to the horizontal position (as three of the clasp arms 230 are depicted in FIG. 14), the second end 234 is caused to rest upon a second upright extension portion 240. The second upright extension portion 240 is provided with a clip type latch 242, while upon the clasp arm 230 there is present a corresponding catch 244 so that the clasp arm 232 may be securely fastened to the second upright extension portion 240.

In the preferred embodiment, the clasp arms 230 are contoured such that a depending or protruding portion 246 may be inserted into the upper cover 14 of a synthesis apparatus 10, the upper cover 14 having a recessed top surface 54, as noted previously, which allows such insertion. Thus, the clasp arms 230 provide some measure of lateral containment and stability during rotation in addition to the primary vertical containment which is afforded.

With continued reference to FIG. 14, the rotation assembly 208 is seen to include a carrier shaft 248 of typical rod-like appearance with a first end 250 and a second end 252. An engagement head 254 is located at the second end 252 and includes a pin 256 which projects therefrom. A pair of retention collars 258 are mounted upon the outside of each of the end walls 214 of the tray 204 to enable secure attachment of the carrier shaft 248 to the tray 204.

During assembly of the carrier apparatus 200, the first end 250 of the carrier shaft 248 is inserted through the apertures 222, 224, and 226, and the carrier shaft 248 is made to be immobile relative to the tray 204 with a set screw 260 located within each retention collar 258. The arrangement provides that any rotation of the carrier shaft 248 about a rotation axis 261 also causes rotation of the tray 204 therewith. Thus, the carrier shaft 248 is not free to rotate irrespective of the tray 204.

As previously stated, the components comprising the carrier apparatus 200 may take a number of forms in order to provide the function of providing an efficient housing for rotation of multiple ones of the synthesis apparatuses 10 inside of the oven apparatus 202. (Most apparent, of course, is that a carrier apparatus such as 200 may be designed to hold any number of synthesis apparatuses 10, and not just four as shown.)

The tray 204, for example, need not have a platform 210 of the particular appearance depicted. A suitable "platform" might be comprised of but a single narrow "crosspiece" that would extend longitudinally in the direction of what is presently shown (in FIG. 14) as the two end walls 214. From this longitudinally extending platform could then be attached the containment arm assemblies 206 via horizontal extension portions perpendicularly attached to the platform. Side walls and end walls such as 212 and 214 may be absent altogether.

It is also apparent, for example, that only two containment arm assemblies such as 206 might be present wherein those containment assemblies would be mounted to provide that a longer clasp arm having a length of that of the tray 204, rather than that of the tray 204 width, would be utilized. This longer clasp arm would be contoured to have two protruding sections for insertion into two of the synthesis apparatuses 10, and would extend between comparable first and second upright extension portions mounted in the location of the end walls 214 as opposed to the side walls 212 as presently depicted.

It is further apparent that the containment arm assemblies 206 need not be comprised of the particular combination of elements depicted, or even be used at all. For example, rather than the combination of elements shown, a simpler latching arrangement might be used in which a large, arcuate wire-type clip is mounted upon one side wall 212 to bear down upon a synthesis apparatuses 10 with a correlating catch on the opposing side wall for attachment thereto.

With regard to the rotation assembly 208, it would be apparent that a carrier shaft 248 of the length depicted need not be utilized. That is, rather than a single long shaft 248 which passes through the entire length of the tray 204, two shorter shaft portions might be utilized which extend outward only from the end walls 214.

Figure 15:
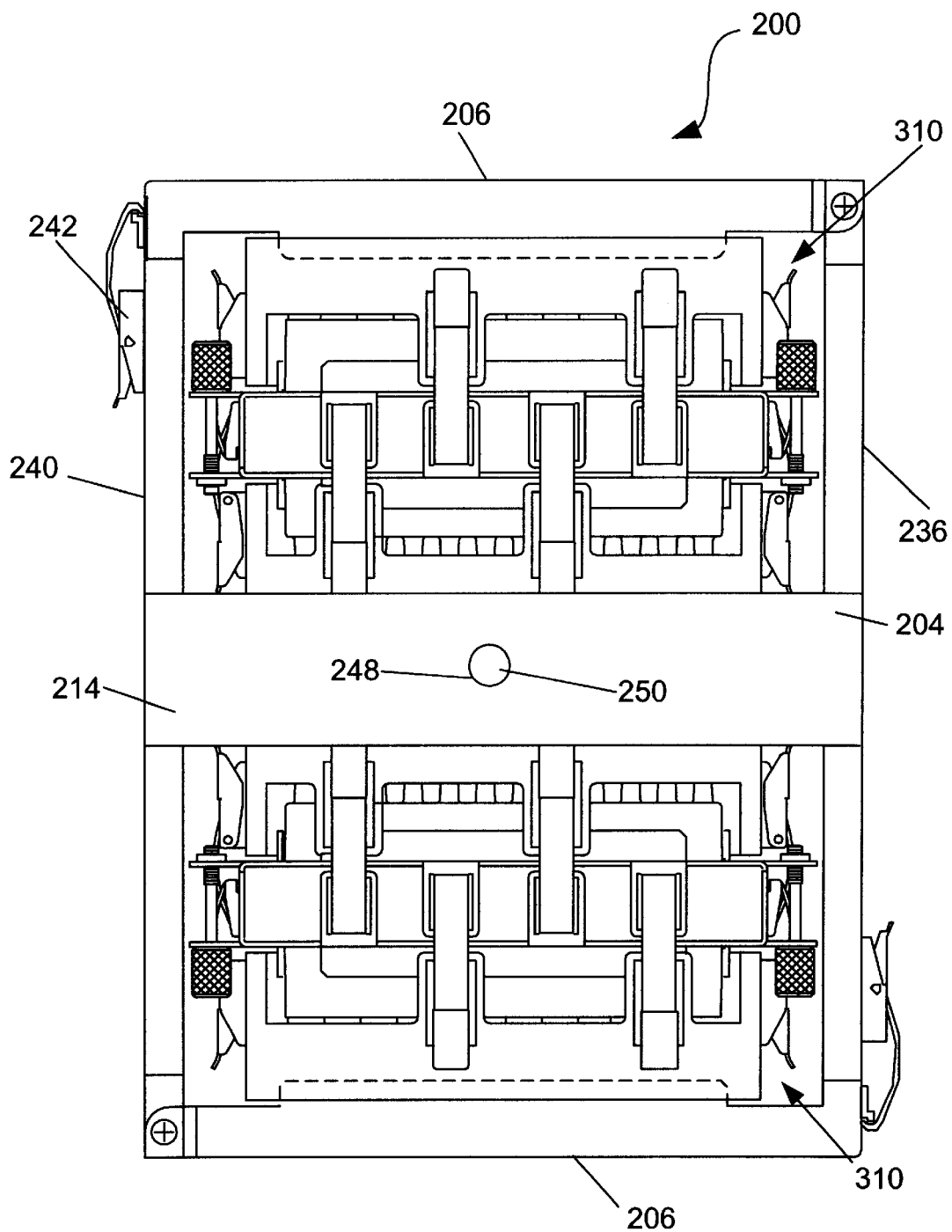
FIG. 15 is an end view of the loaded carrier apparatus of FIG. 14.
Figure 16:
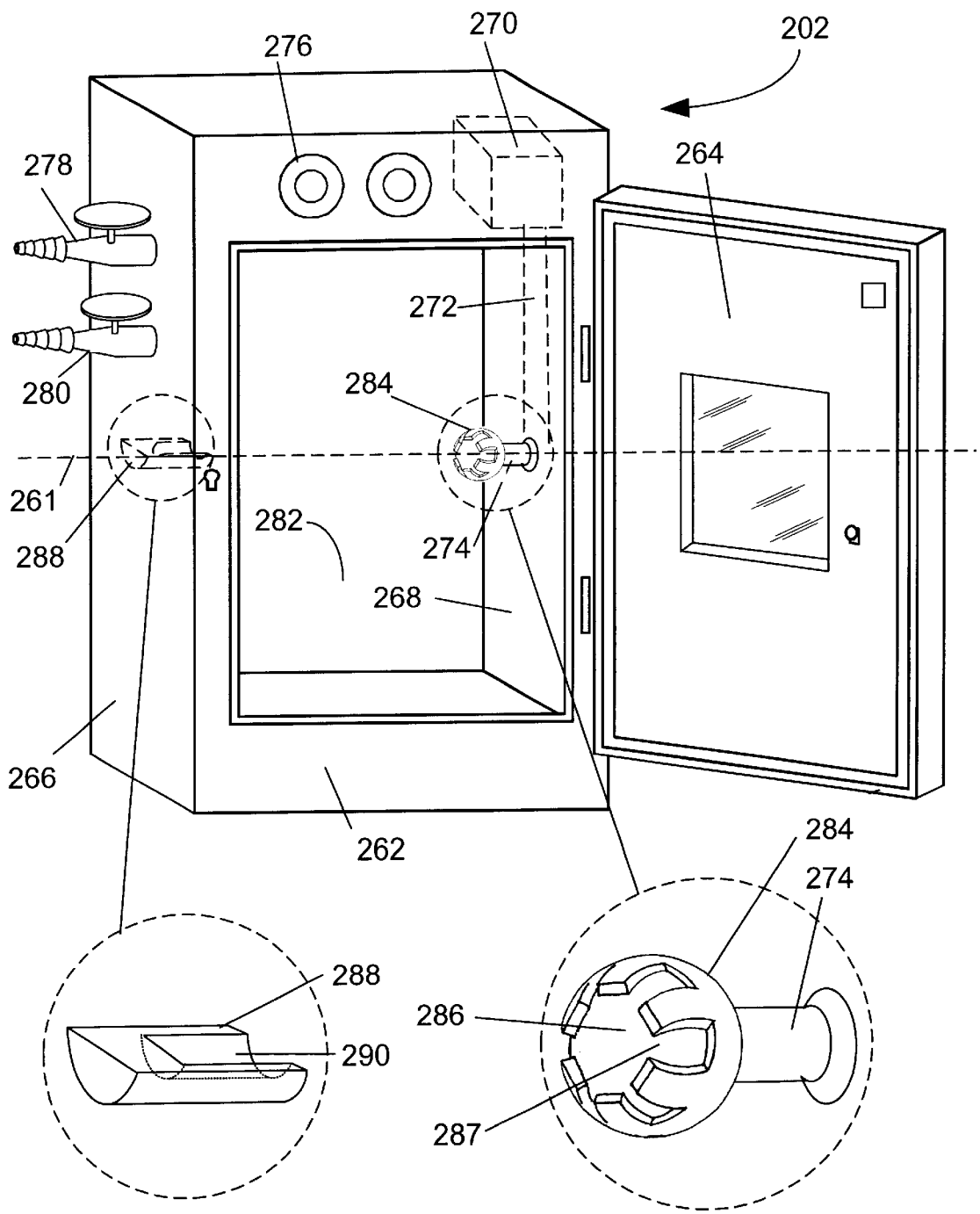
FIG. 16 is a perspective view of the oven assembly of the present invention.

Referring now to the perspective view of FIG. 16, as well as FIGS. 14 and 15, the oven assembly 202 within which the carrier apparatus 200 is caused to be rotated is primarily conventional in nature and includes an oven body 262 and a windowed oven door 264. A pair of opposing first and second side walls 266 and 268, respectively, are insulated, as is the remainder of the oven body 262 and the oven door 264. A drive motor 270 delivers rotational force through a drive linkage 272 to an abbreviated drive shaft 274. A control panel 276 includes a number of controls to adjust such factors as the oven temperature, rotation speed, and power on and off. Such a control panel as 276 may also be provided remotely from the oven body 262 (e.g., with an electrical tether) to reduce the likelihood of spark ignition. Vacuum and gas inlets 278 and 280, respectively, are also present to provide for an inert atmosphere capability.

An interior cavity 282 is defined by the oven body 262 and the oven door 264 and is suitably large enough such that the carrier assembly 200 may rotate within the interior cavity 282 about the rotation axis 261 without interference. The manner in which the carrier assembly 200 is attached within the interior cavity 282 in order to accomplish such rotation now follows.

With continued reference to FIG. 16, and especially to the close-up partial views depicted therein, the drive shaft 274, which extends horizontally a short distance into the interior cavity 282 from the second side wall 268, is provided with a fixed bearing cup 284. The bearing cup 284 includes a hollow chamber 286 having a plurality of slots 287 within which the engagement head 254 and pin 256 of the carrier shaft 248 are capable of being received. The chamber 286 and any one of the slots 287 provides a form of key hole, with the engagement head 254 and protruding pin 256 being inserted in key-like fashion so that the carrier shaft 248 may be supported and caused to rotate as the drive shaft 274 is turned.

In-line with the drive shaft 274 and extending into the interior cavity 282 from the opposing first side wall 266 is a bearing seat 288 which offers support for the first end 250 of the carrier shaft 248. The bearing seat 280 has the form of a shaft with a depression 290 suitably sized so that the carrier shaft 248 may be supportably cradled therein as the carrier shaft 248 rotates.

The arrangement described provides that the carrier apparatus 200 is rotated about the rotation axis 261 while still being removable as necessary to give convenient access to the synthesis apparatuses 10 carried thereby.

It would be apparent that a multitude of other rotation interfaces might be used as well, including such interfaces as might provide for a carrier apparatus 200 that is fixed within the interior cavity 282. Any number of rotational force transfer systems might also be used in conjunction with the drive motor 270, including geared, sprocket and chain, etc.

In addition to the above mentioned examples, it is to be understood that various other modifications and alterations with regard to the types of materials used, their method of joining and attachment, and the shapes, dimensions and orientations of the components as described may be made without departing from the invention. Accordingly, the above disclosure is not to be considered as limiting and the appended claims are to interpreted as encompassing the entire spirit and scope of the invention.

INDUSTRIAL APPLICABILITY

The synthesis apparatus 10 (and still including the alternative embodiments 310 and 412) of the present invention is designed to be used for any chemical synthesis procedure in which it is expedient that numerous, individual micro-scale reactions occur simultaneously and where filtration may be a necessary step during the synthesis process or workup procedure. The synthesis block 12, in conjunction with the manifold apparatus 100, also finds use for multiple, simultaneous micro-scale chromatographic purifications (and workups/extractions), as described below. Non-chemistry related uses include parallel culturing of microorganisms, particularly anaerobic organisms, among other uses.

The synthesis apparatus 10 will be found to be especially useful with respect to solid phase organic synthesis where chemical linkers and starting structures are bound to polymer resin supports in order to permit chemical coupling or transformation in that conveniently bound form. The synthesis apparatus 10 is similarly expected to find use in myriad other chemical syntheses in which a heterogenous reaction mixture is present due to insoluble salts or resins, such as might be employed for catalysis, and/or where precipitated by-products or end-products are anticipated, and wherein filtration is also necessary at some point in a reaction process.

As noted, a further use of the synthesis and manifold apparatuses (10 and 100) is for purification purposes. Thus, each well 24 may serve as a miniature column for chromatographic purification of chemical mixtures on silica gel, alumina, and various affinity resins as are commonly employed in the art of column chromatography. Depending on the difficulty of the separation contemplated, elution of the chromatography solvent might be gravity-wise or elution may be assisted with a reduced pressure via the manifold apparatus 100. The invention (10 and 100) may also be used for simple ion exchange resin purposes and solid phase extraction as well.

Use of the synthesis and manifold apparatuses (10 and 100) is simple. A typical solid phase synthesis procedure might be as follows: The outlet spouts 40 of the wells 24 are sealed by placing the second sheet gasket 20 within the lower cover 16 and then clipping the lower cover 16 and sheet gasket 20 onto the synthesis block 12. (In the case of the alternative embodiment 310, the reinforcement assembly 372 will have first been attached to the skirt 26 of the synthesis block 312 and then the lower cover 316 clipped onto the upper collar 374— rather than onto the synthesis block 312 itself.) The resin-bound starting chemical structure, solvent, and any air-stable reagents are then added to any number or all of the wells 24 using, for example, a multichannel pipette.

The first gasket sheet 18 and upper cover 14 are then clipped upon the synthesis block 12 (or the lower collar 376 in the case of embodiment 310) to seal the tops of the wells 24. Air-sensitive reagents may then be safely added via syringe through the holes 70 of the upper cover 14. (Provision of an inert atmosphere and pressure equalization with an inert gas inlet tube and needle may or may not be required.) The synthesis apparatus 10 is then subjected to agitation and also heat treatment, as required, using the carrier apparatus 200 and associated oven assembly 202.

Use of the carrier apparatus 202 and associated oven assembly 202 is also simple. One or two of the synthesis apparatuses 10 are placed upon one side of the platform 210 of the carrier apparatus 200 and the appropriate clasp arms 230 are latched in place. The carrier apparatus 200 is then inverted and up to two (for the embodiment shown) additional synthesis apparatuses 10 are placed on the second side of the platform 210 and the corresponding clasp arms 230 are again latched.

The carrier apparatus 200 is then transferred to the oven assembly 202. The engagement head 254 is first inserted within the bearing cup 284 and the first end 250 of the carrier shaft 248 laid within the bearing seat 288. The oven door 264 is closed and rotation and heating is commenced for the time period necessary.

Upon completion of the particular reaction step or synthesis, and after removal from the oven assembly 202 and carrier apparatus 200, the synthesis apparatus 10 is inverted so that the lower cover 16 and second sheet gasket 20 may be removed, the independent cover removal system providing that the upper cover 14 remains tightly in place. With the collection plate 123 positioned within the manifold apparatus 100 as previously described, the manifold apparatus 100 is inverted and placed over the synthesis block 12 so that the collection plate 123 is caused to be placed over the outlet spouts 40 and the synthesis block 12 is caused to be placed within the open area 130 and upon the shelf 130 of the lid 104. The combined assembly is then turned right side up. Alternatively, in the case of many solvents, the liquid contents are sufficiently held back by a partial vacuum due to the tops of the wells 24 remaining sealed such that the inversion procedure is not necessary to prevent escape of material from the orifices 50 of the wells 24 as the synthesis block 12 is simply placed directly over the collection plate 123 after removal of the bottom cover 16.

The upper cover 14 and first sheet gasket 18 are then removed and a vacuum is applied as necessary. Solvent is typically used to rinse the resin support, and any washings or product-containing effluent drains neatly into the collection plate 123.

In some instances, it may be desired not to use a vacuum method for elution of the liquid contained within the wells 24, in which case centrifugation (e.g., "swinging bucket") and pressurization methods might be used.

The described synthesis and manifold apparatuses (10 and 100), and the associated carrier apparatus 200 and oven assembly 202, enable the researcher to be more efficient and permit, for example, the rapid simultaneous synthesis of numerous analogs of a particular chemical compound to speed submission of samples for biological testing and evaluation in the pharmaceutical field.

For the foregoing reason, and for numerous others as set forth previously herein, it is expected that the industrial applicability and commercial utility of the present invention will be extensive and long lasting.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. An apparatus for multiple, simultaneous synthesis, comprising:

a synthesis block made of synthesis block material, said synthesis block including a plurality of wells, each well having a tube bore, said wells arranged in ordered array, each of said wells being integrally formed in said synthesis block, and non-removeable from said synthesis block, each well having an inlet portion and an outlet spout, said synthesis block further having a periphery;

a first sheet gasket sealable upon the inlet portions;

a second sheet gasket sealable upon the outlet spouts;

an upper cover for pressured engagement with said first sheet gasket;

a lower cover for pressured engagement with said second sheet gasket; and attachment means for releasably and independently attaching each one of said upper and lower covers to said periphery.

2. The apparatus of claim 1 wherein:

each well further includes a well bottom in fluid communication with the outlet spouts, and a filter element, the filter element seated upon the well bottom.

3. The apparatus of claim 1 wherein:

said upper cover includes a plurality of apertures in axial alignment with the wells.

4. The apparatus of claim 1 further including:

a manifold apparatus and said synthesis block further having a block body lower surface, the manifold apparatus including a base, a removable lid, a first gasket, a second gasket, and means for securing the lid, to the base, the base having an open chamber sized to receive a collection plate, a top surface, and an outlet for applying a reduced pressure to the chamber, the lid having an open area bounded by a shelf, the first and second gaskets having a generally rectangular band shape, the first gasket interposable between the base top surface and the lid, the second gasket interposable between the shelf and the block body lower surface.

5. The apparatus of claim 1 further including:

agitation means for agitating at least one synthesis block with said upper and lower covers attached.

6. The apparatus of claim 5 wherein:

said agitation means includes a carrier apparatus, the carrier apparatus including a platform, the platform sized to receive the at least one synthesis block, retaining means for retaining the at least one covered synthesis block upon the platform, at least one shaft affixed to the platform and extending planarly therefrom, and rotational drive means for turning the shaft.

7. The apparatus of claim 1 wherein:

said attachment means includes a plurality of threaded rods.

8. The apparatus of claim 1 wherein:

said upper and lower covers have a dimensional footprint which corresponds to that of a standard microplate.

9. The apparatus of claim 1 wherein:

each inlet portion includes a distinctly raised, thin-walled well rim.

10. The apparatus of claim 1 wherein:

said inlet portions are separated by rifts.

11. The apparatus of claim 1 wherein:

said tube bores are arrayed in a standard 96-well format.

12. The apparatus of claim 1 wherein:

said outlet spouts have a tapered Luer-tip shape.

13. The apparatus of claim 1 wherein:

said tube bores have a cross-sectional shape selected from the group of shapes consisting of round and rounded square, each outlet spout in general axial alignment with each tube bore.

14. The apparatus of claim 1 wherein:

said tube bores have a cross-sectional shape selected from the group of shapes consisting of generally rectangular and oval, each outlet spout axially offset with respect to each tube bore to provide alignment of said outlet spouts with the odd-numbered columns of wells of a multi-well collection plate in a first orientation of said block, and alignment with the even-numbered columns of wells of the collection plate in a second orientation in which said block is turned 180 degrees from the first orientation.

15. The apparatus of claim 1 wherein:

each tube bore has an inclined bottom surface portion, the lower aspect of which is in the direction of said outlet spouts.

\* \* \* \* \*